United States Patent
Severenuk et al.

(10) Patent No.: US 12,555,280 B2
(45) Date of Patent: Feb. 17, 2026

(54) VECTOR GRAPHICS BASED LIVE SKETCHING METHODS AND SYSTEMS

(71) Applicant: COREL CORPORATION, Ottawa (CA)

(72) Inventors: Tony Severenuk, Kemptville (CA); Paul Legomski, Toronto (CA); Tekin Ozbek, Ottawa (CA); Thomas Jackson, Ottawa (CA); Boban Bogdanic, Banja Luka (BA); Andrew Stacey, Ottawa (CA)

(73) Assignee: Corel Corporation, Ottawa (CA)

( * ) Notice: Subject to any disclaimer, the term of this patent is extended or adjusted under 35 U.S.C. 154(b) by 343 days.

(21) Appl. No.: 18/349,346

(22) Filed: Jul. 10, 2023

(65) Prior Publication Data

US 2023/0351652 A1    Nov. 2, 2023

Related U.S. Application Data

(63) Continuation of application No. 17/157,035, filed on Jan. 25, 2021, now Pat. No. 11,741,644, which is a
(Continued)

(51) Int. Cl.
*G06V 30/32* (2022.01)
*G06F 3/01* (2006.01)
*G06T 11/20* (2006.01)

(52) U.S. Cl.
CPC .......... *G06T 11/203* (2013.01); *G06F 3/016* (2013.01); *G06V 30/32* (2022.01); *G06V 30/347* (2022.01)

(58) Field of Classification Search
CPC ....... G06T 11/203; G06F 3/016; G06V 30/32; G06V 30/347
See application file for complete search history.

(56) References Cited

U.S. PATENT DOCUMENTS

| | | |
|---|---|---|
| 5,133,052 A | 7/1992 | Bier et al. |
| 5,588,100 A | 12/1996 | Parker |

(Continued)

OTHER PUBLICATIONS

Ku, Qin & Wright—Interpretation of Overtracing Freehand Sketching for Geometric Shapes, 2006. (Year: 2006).*

(Continued)

*Primary Examiner* — Daniel F Hajnik
*Assistant Examiner* — Adeel Bashir

(57) ABSTRACT

Vector format based computer graphics tools have become very powerful tools allowing artists, designers etc. to mimic many artistic styles, exploit automated techniques, etc. and across different simulated physical media and digital media. However, hand-drawing and sketching in vector format graphics is unnatural and a user's strokes rendered by software are generally unnatural and appear artificial. In contrast to today's hand-drawing and sketching which requires significant training of and understanding by the user of complex vector graphics methods embodiments of the invention lower the barrier to accessing computer graphics applications for users in respect of making hand-drawing or sketching easier to perform. Accordingly, the inventors have established a direct vector-based hand-drawing/sketching entry format supporting any input methodology.

16 Claims, 15 Drawing Sheets

Related U.S. Application Data continuation of application No. 16/429,275, filed on Jun. 3, 2019, now Pat. No. 10,902,653, which is a continuation of application No. 15/907,773, filed on Feb. 28, 2018, now Pat. No. 10,521,937.

(60) Provisional application No. 62/464,641, filed on Feb. 28, 2017.

(56) References Cited

U.S. PATENT DOCUMENTS

| | | | |
|---|---|---|---|
| 6,462,739 | B1 | 10/2002 | Gupta |
| 2002/0150297 | A1* | 10/2002 | Gorbatov ............ G06F 3/04883 382/202 |
| 2004/0233197 | A1 | 11/2004 | Liu et al. |
| 2006/0045343 | A1* | 3/2006 | Tremblay ............. G06V 30/422 382/186 |
| 2006/0062465 | A1 | 3/2006 | Li et al. |
| 2012/0086718 | A1 | 4/2012 | Schreiber |
| 2012/0133664 | A1 | 5/2012 | Zhu et al. |
| 2012/0216141 | A1 | 8/2012 | Li |
| 2012/0293558 | A1 | 11/2012 | Dilts |
| 2013/0127836 | A1 | 5/2013 | Joshi et al. |
| 2016/0320912 | A1 | 11/2016 | Seto et al. |
| 2016/0371859 | A1 | 12/2016 | Fujimori |

OTHER PUBLICATIONS

Fonseca—Sketch-Based Retrieval in Large Sets of Drawings, 2004 (Year: 2004).*

Sun, Liu, Peng, Zhang & Sun—User Adaptation for Online Sketchy Shape Recognition, 2004. (Year: 2004).*

Mihu et al—Geometric Shape Recognition Using Fuzzy and Neural Techniques, 2003 (Year: 2003).*

Jorge, Nunes & Fonseca—A Simple Approach to Recognise Geometric Shapes Interactively, 1999. (Year: 1999).*

* cited by examiner

VECTOR GRAPHICS BASED LIVE SKETCHING METHODS AND SYSTEMS

CROSS-REFERENCE TO RELATED APPLICATIONS

This patent application claims the benefit of priority as a continuation from U.S. patent application Ser. No. 17/157,035 filed Jan. 25, 2021; which itself claims the benefit of priority as a continuation of U.S. patent application Ser. No. 16/429,275 filed Jun. 3, 2019 which has issued as U.S. Pat. No. 10,902,653; which itself claims the benefit of priority as a continuation from U.S. patent application Ser. No. 15/907,773 filed Feb. 28, 2018 which has issued as U.S. Pat. No. 10,521,937; which itself claims the benefit of priority from U.S. Provisional Patent Application 62/464,641 filed Feb. 28, 2017, the entire contents of which are incorporated herein by herein by reference.

FIELD OF THE INVENTION

This invention relates to digital imagery and more particularly to enabling and supporting sketching and natural sketching techniques within mark making tools for digital vector graphics and digital imagery software applications.

BACKGROUND OF THE INVENTION

Digital graphics and digital image editing are the processes of creating and/or modifying digitally generated or digitally acquired and stored image data. Using specialized software programs, users may create, generate, manipulate, edit and transform images in a variety of ways. These digital image editors may include programs of differing complexity, such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets. Similarly, digital graphics editors may include programs of differing complexity, such as limited-purpose programs associated with acquisition devices (e.g., digital cameras and scanners with bundled or built-in programs for managing colour balance or applying specific graphics effects); limited editors suitable for relatively simple graphics generation (e.g., for example as part of general suites of software for business and/or residential users); and professional-grade programs with large and complex feature sets (e.g., simulating different artistic formats such as watercolour, calligraphy, pastels, oils, etc. with various applicators including various brushes, pens, air brushes, markers, sponges and knives).

Digital graphics and digital images may include, for example, "formatted" graphics and/or graphics data for use in generating an image with a digital graphics editor suite prior to "printing" the final or interim image. Accordingly, such graphics and images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a colour bitmap defined in the RGB (red, green blue) colour space may comprise between one and eight bits per pixel for each of the red, green, and blue channels. Another commonly used representation is a CMYK colour space. In these and other colour space representations, an alpha channel may be used to store additional data such as per-pixel transparency values (or the inverse-opacity values). For example, per-pixel data representing paint on a brush tool or on a canvas may include a set of colour values (e.g., one per channel) and an opacity value for the paint. In contrast vectors graphics are generally characterized by the use of geometrical primitives such as points, lines, curves, and shapes or polygons, all of which are based on mathematical expressions, to represent images along with boundary information (e.g. stroke line style and colour) and fill information (e.g. fill style and colour). As such vector graphics allows for manipulation of individual elements or groups of elements within the graphical image independent of the overall graphical image. Further, formats such as Scalable Vector Graphics (SVG, an XML-based vector image format) allow two-dimensional graphics supporting interactivity and animation wherein as they are specified within and have their behaviors defined in XML text files they can be searched, indexed, scripted, and compressed plus as SVG rendering is supported by all major modern web browsers an image can be generated, defined, and transmitted wherein the receiving device based upon the display etc. generates the final image displayed to the user.

An operation often provided by digital graphics and digital image editors is the use of mark making tools such as virtual "paintbrushes", "pens" (defined by "pen nibs"), "pencils", "pastels" etc. which are used to modify a digital image by depositing virtual paint, virtual ink, virtual chalk, or virtual graphite etc. Within the prior art significant effort has gone into establishing realistic "virtual" representations of applying brushes, ink, chalk etc. as well as simulating the flow or absorption of inks, watercolour paints etc. on different artistic papers etc. Existing applications provide multiple settings for users to control the appearance of the stroke, e.g. size, opacity, mark making tool, and brush style as they make a motion within an input device on the computer system such as a mouse, a touchscreen, a stylus, etc. Additional software features seek to increase the realism of strokes by simulating varying user tool handling, pressure, angle of tool, etc. providing for the application of predefined functions and/or jitter to the values of the mark making tool within the stroke. Predefined functions address, for example, the initial or final stages of a stroke for the application of a brush to canvas whilst jitter addresses the intervening section of the stroke. In this manner, a brush stroke may be simulated as having increasing pressure at the beginning of stroke, some variability in pressure during the stroke, and decreasing pressure at the end of the stroke.

However, fundamentally all of these software enhancements, modifications, mark making tools etc. are driven by the user providing input via an input device such as a mouse, a touchscreen, a stylus, etc. However, hand-drawing and sketching in vector format graphics is very unnatural and accordingly a user's strokes with mark making tools that are rendered by software application will generally be unnatural and appear artificial despite the goal of the software application being to simulate as realistically as possible. Hand-drawing and sketching within a vector-based graphics application to date has required significant training of and understanding by the user with respect to complex vector graphics methods including, example, whether to use quadratic versus cubic Beziers, B-splines, 3-point curves, polylines, node editing, smoothing, etc. Accordingly, it would be beneficial to lower the barrier to accessing computer graphics applications for users in respect of making hand-drawing or sketching easier to perform.

Further it would be beneficial even with traditional illustrators to enhance hand-drawing and sketching interfaces as may illustrators still draw their art or design on real paper first and converting ink/pen/pencil on paper to vector graphics for editing is at presented difficult and complex. Within the prior art the conversion of a hand drawn pencil sketch to a vector graphics image within a computer graphics application generally involves the user of multiple software applications and the performance of typically 15+ steps comprising drawing, cleaning up, scanning, cleaning up, tracing, cleaning up, editing and assigning features/properties etc. From reviewing the prior art and online tutorials etc., see for example https://www.shutterstock.com/blog/2011/06/converting-to-vector-art/, every sketch involves a different approach and unique steps to obtain a good result. This is already too complex, time-consuming, and tedious for most traditional artists to even attempt so what chance does the average consumer as a user stand.

Even where the user is sketching with a digital pen-based tablet requires special hardware/software and industry leading software products still only result in raster outputs which still require tracing in order to obtain a vector result that can be edited. Accordingly, a direct vector-based hand-drawing/sketching entry format through any input methodology would be beneficial.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to digital imagery and more particularly to enabling and supporting sketching and natural sketching techniques within mark making tools for digital vector graphics and digital imagery software applications.

In accordance with an embodiment of the invention there is provided a method comprising:
  receiving a plurality of discrete user generated strokes made with a mark making tool within a computer based graphics software application in execution upon a microprocessor based computer; and
  converting the plurality of discrete user generated strokes to one or more vector poly-curve lines.

In accordance with an embodiment of the invention there are provided non-volatile non-transitory memory storing computer executable instructions for execution by a microprocessor, wherein when executed the computer executable instructions relate to a process, the process comprising the steps:
  receiving a plurality of discrete user generated strokes made with a mark making tool within a computer based graphics software application in execution upon a microprocessor based computer; and
  converting the plurality of discrete user generated strokes to one or more vector poly-curve lines.

In accordance with an embodiment of the invention there is provided a method comprising: receiving the plurality of discrete user generated strokes comprises:
  executing a timer-based recognition process of user generated strokes;
  acquiring data points relating to the user generated strokes;
  converting the plurality of discrete user generated strokes comprises:
    analyzing multi-dimensional properties of each acquired data point within the acquired data points to infer overall intent;
    generate an output in dependence upon the inferred overall intent; and
    processing the inferred overall intent to improve the final result.

In accordance with an embodiment of the invention there is provided a method comprising:
  receiving the plurality of discrete user generated strokes comprises:
    acquiring user entry strokes via an input device relating to a mark making tool within a user defined time window; and
  converting the plurality of discrete user generated strokes comprises:
    comparing original un-approximated pairs of polylines to each other;
    heuristically connecting relevant points based on time, spatial, and relational proximity;
    feeding properties into a trainable feed-forward neural network to determine groupings;
    applying a graph theory technique to derive weighted connections between each pair of points;
    algorithmically dynamically tuning parameters to tailor for known drawing types and scenarios;
    utilizing a minimum spanning tree variant to infer the overall intent of each group;
    determining trunk branches within the minimum spanning tree and pruning away smaller branches in at least one stage of a plurality of stages; and
    applying a curve fitting routine to generate the one or more vector poly-curve lines.

In accordance with an embodiment of the invention there are provided non-volatile non-transitory memory storing computer executable instructions for execution by a microprocessor, wherein when executed the computer executable instructions relate to a process, the process comprising the steps:
  receiving the plurality of discrete user generated strokes comprises:
    executing a timer-based recognition process of user generated strokes;
    acquiring data points relating to the user generated strokes;
  converting the plurality of discrete user generated strokes comprises:
    analyzing multi-dimensional properties of each acquired data point within the acquired data points to infer overall intent;
    generate an output in dependence upon the inferred overall intent; and
    processing the inferred overall intent to improve the final result.

In accordance with an embodiment of the invention there are provided non-volatile non-transitory memory storing computer executable instructions for execution by a microprocessor, wherein when executed the computer executable instructions relate to a process, the process comprising the steps:
  receiving the plurality of discrete user generated strokes comprises:
    acquiring user entry strokes via an input device relating to a mark making tool within a user defined time window; and
  converting the plurality of discrete user generated strokes comprises:

comparing original un-approximated pairs of polylines to each other;

heuristically connecting relevant points based on time, spatial, and relational proximity;

feeding properties into a trainable feed-forward neural network to determine groupings;

applying a graph theory technique to derive weighted connections between each pair of points;

algorithmically dynamically tuning parameters to tailor for known drawing types and scenarios;

utilizing a minimum spanning tree variant to infer the overall intent of each group;

determining trunk branches within the minimum spanning tree and pruning away smaller branches in at least one stage of a plurality of stages; and applying a curve fitting routine to generate the one or more vector poly-curve lines.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
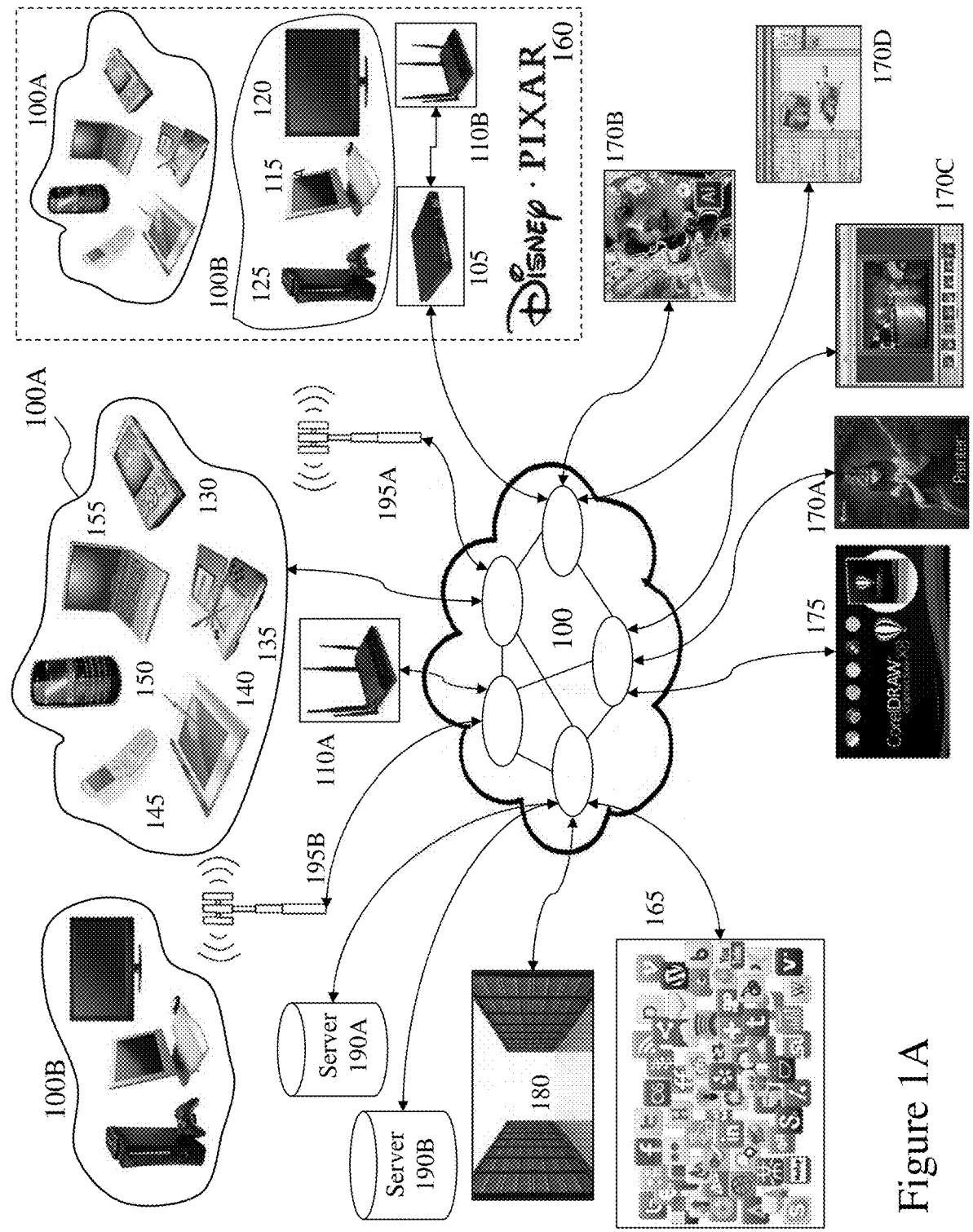
FIG. 1A depicts a network environment within which embodiments of the invention may be employed.

The present invention is directed to digital imagery and more particularly to enabling and supporting sketching and natural sketching techniques within mark making tools for digital vector graphics and digital imagery software applications.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purposes only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "software application", also referred to as an "application" or "app", as used herein may refer to, but is not limited to, a "standalone software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third-party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by providing a gesture or data relating to a gesture to a software application.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is capable of being at least one of generated, selected, created, modified, and transmitted with a software application allowing a user of the software application to generate, select, create, modify, and edit visual and/or audiovisual content within the digital content.

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet. "Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

A "mark making tool", also referred to as a "mark tool" or "marking tool", as used herein may refer to, a tool for applying a visual effect to a graphics image within a software application including, for example, a graphics generating tool, a graphics editing tool, and an image processing tool. Accordingly, a mark making tool may simulate real and unreal systems for the application, removal, or modification of information including, but not limited to, colour, texture, and content to a graphics image. As such a mark making tool may include, but is not limited to, a brush, an air brush, a pen, a pencil, a nib, a spray can, a sprayer, a sponge, a knife, a mathematical algorithm, a physical system of elements obeying physical laws, and a physical system obeying non-physical laws.

A "gesture", also referred to as a "motion" or "input", as used herein may refer to, an action resulting in the movement and/or action of a mark making tool relative to a graphics image within a software application including, for example, a graphics generating tool, a graphics editing tool, and an image processing tool. As such a gesture may include, but not be limited to, a swipe, a tap, a motion, a press, and a click captured by the software application through an interface including, but not limited to, image processing, image capture, audio command, a user interface and a haptic interface.

A "gesture characteristic", also referred to as a "gesture expression" or an "expression", as used herein may refer to an aspect of a gesture exploited within a software application to modify a value relating to a mark making tool within the software application. As such a gesture characteristic or expression may include, but not be limited to, velocity, direction, pressure, wheel, tilt, bearing, rotation, source of the gesture, and random. A source of the gesture may include, but not be limited to, a touchpad, a stylus, a mouse, keypad, keyboard, accelerometer or accelerometer derived data, tracked motion of a user or a predetermined portion of a user, an external image source, an external audiovisual source, an external multimedia source, biometric data of a user, and an item of environmental data. An expression or gesture characteristic may be applied to one or more behaviours/aspects of a mark making tool including, but not limited to, global chaos, local chaos, smoothness, damping, jitter, number, count, weighting, force, direction, mapping, colour, colour variability, resaturation, bleed, feature, grain, concentration, setting rate, viscosity, wetness, opacity and hardness.

A "user interface", also referred to as a "controller" or "haptic interface", as used herein may refer to a device and/or system capturing one or more actions of a user and providing these to a software application. Accordingly, a user interface may include an image capture/processing system, a gesture recognition system, a stylus, a wearable device, a touchscreen, a keypad, a mouse, a touchpad, a tablet, an accelerometer, and a motion recognition system.

Reference to "LiveSketch™" as used herein may refer to, but is not limited to, any machine-readable and machine-storable work product incorporating an embodiment of the invention or any machine-readable and machine-storable work product providing an embodiment of the invention. LiveSketch™ is used as an identifying term only as is not intended to relate directly to any specific software product, software suite, software plug-in, or software application.

Referring to FIG. 1A there is depicted a network environment 100 within which embodiments of the invention may be employed supporting graphics sketching systems and graphics editing applications/platforms (GSS-GEAPs) according to embodiments of the invention. Such GSS-GEAPs, for example including digital graphics editor and digital painting applications. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. Disney Pixar™, within which are other first and second user groups 100A and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 or Bluetooth as well in an ad-hoc manner.

Also connected to the network 100 are Social Networks (SOCNETS) 165, first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first graphics design tool 175, e.g. CorelDRAW™, as well as first and second servers 190A and 190B which together with others, not shown for clarity. First and second servers 190A and 190B may host according to embodiments of the inventions multiple services associated with a provider of graphics editing systems and graphics editing applications/platforms (GSS-GEAPs); a provider of a SOCNET or Social Media (SOME) exploiting GSS-GEAP features; a provider of services to PEDS and/or FEDS exploiting GSS-GEAP features; a provider of one or more aspects of wired and/or wireless communications; an Enterprise 160 exploiting GSS-GEAP features; license databases; content databases; image databases; content libraries; customer databases; websites; and software applications for download to or access by FEDs and/or PEDs exploiting and/or hosting GSS-GEAP features. First and second primary content servers 190A and 190B may also host for example other Internet services such as a search engine, financial services, third party applications and other Internet based services.

Accordingly, a graphics designer and/or user (GRADUS or user) may exploit a PED and/or FED within an Enterprise 160, for example, and access one of the first or second primary content servers 190A and 190B respectively to perform an operation such as accessing/downloading an application which provides GSS-GEAP features according to embodiments of the invention; execute an application already installed providing GSS-GEAP features; execute a web based application providing GSS-GEAP features; or access content. Similarly, a GRADUS may undertake such actions or others exploiting embodiments of the invention exploiting a PED or FED within first and second user groups 100A and 100B respectively via one of first and second cellular APs 195A and 195B respectively and first Wi-Fi nodes 110A. Optionally, the user may perform these tasks through a wearable device discretely or in combination with a FED and/or PED.

Figure 1B:
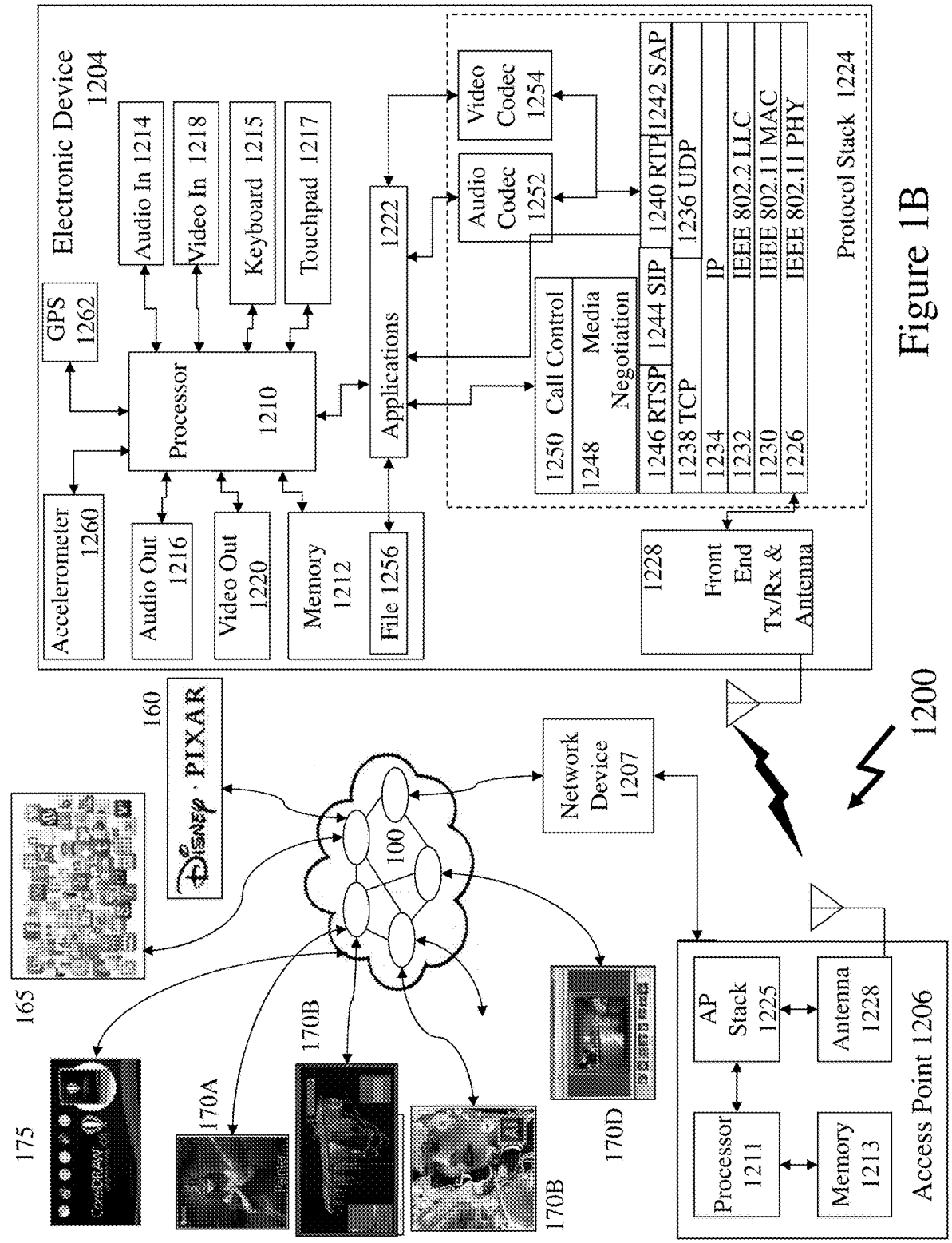
FIG. 1B depicts a wireless portable electronic device supporting communications to a network such as depicted in FIG. 1A and as supporting embodiments of the invention.

Now referring to FIG. 1B there is depicted an electronic device 1204 and network access point 1207 supporting GSS-GEAP features according to embodiments of the invention. Electronic device 1204 may, for example, be a PED and/or FED and may include additional elements above and beyond those described and depicted. Also depicted within the electronic device 1204 is the protocol architecture as part of a simplified functional diagram of a system 1200 that includes an electronic device 1204, such as a smartphone 155, an access point (AP) 1206, such as first AP 110, and one or more network devices 1207, such as communication servers, streaming media servers, and routers for example such as first and second servers 190A and 190B respectively. Network devices 1207 may be coupled to AP 1206 via any combination of networks, wired, wireless and/or optical communication links such as discussed above in respect of FIG. 1 as well as directly as indicated. Network devices 1207 are coupled to network 100 and therein Social Networks (SOCNETS) 165, first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first graphics design tool 175, e.g. CorelDRAW™. The electronic device 1204 includes one or more processors 1210 and a memory 1212 coupled to processor(s) 1210. AP 1206 also includes one or more processors 1211 and a memory 1213 coupled to processor(s) 1210. A non-exhaustive list of examples for any of processors 1210 and 1211 includes a central processing unit (CPU), a digital signal processor (DSP), a reduced instruction set computer (RISC), a complex instruction set computer (CISC) and the like. Furthermore, any of processors 1210 and 1211 may be part of application specific integrated circuits (ASICs) or may be a part of application specific standard products (ASSPs). A non-exhaustive list of examples for memories 1212 and 1213 includes any combination of the following semiconductor devices such as registers, latches, ROM, EEPROM, flash memory devices, non-volatile random-access memory devices (NVRAM), SDRAM, DRAM, double data rate (DDR) memory devices, SRAM, universal serial bus (USB) removable memory, and the like.

Electronic device 1204 may include an audio input element 1214, for example a microphone, and an audio output element 1216, for example, a speaker, coupled to any of processors 1210. Electronic device 1204 may include a video input element 1218, for example, a video camera or camera, and a video output element 1220, for example an LCD display, coupled to any of processors 1210. Electronic device 1204 also includes a keyboard 1215 and touchpad 1217 which may for example be a physical keyboard and touchpad allowing the user to enter content or select functions within one of more applications 1222. Alternatively, the keyboard 1215 and touchpad 1217 may be predetermined regions of a touch sensitive element forming part of the display within the electronic device 1204. The one or more applications 1222 that are typically stored in memory 1212 and are executable by any combination of processors 1210. Electronic device 1204 also includes accelerometer 1260 providing three-dimensional motion input to the process 1210 and GPS 1262 which provides geographical location information to processor 1210.

Electronic device 1204 includes a protocol stack 1224 and AP 1206 includes a communication stack 1225. Within system 1200 protocol stack 1224 is shown as IEEE 802.11 protocol stack but alternatively may exploit other protocol stacks such as an Internet Engineering Task Force (IETF) multimedia protocol stack for example. Likewise, AP stack 1225 exploits a protocol stack but is not expanded for clarity. Elements of protocol stack 1224 and AP stack 1225 may be implemented in any combination of software, firmware and/or hardware. Protocol stack 1224 includes an IEEE 802.11-compatible PHY module 1226 that is coupled to one or more Front-End Tx/Rx & Antenna 1228, an IEEE 802.11-compatible MAC module 1230 coupled to an IEEE 802.2-compatible LLC module 1232. Protocol stack 1224 includes a network layer IP module 1234, a transport layer User Datagram Protocol (UDP) module 1236 and a transport layer Transmission Control Protocol (TCP) module 1238.

Protocol stack 1224 also includes a session layer Real Time Transport Protocol (RTP) module 1240, a Session Announcement Protocol (SAP) module 1242, a Session Initiation Protocol (SIP) module 1244 and a Real Time Streaming Protocol (RTSP) module 1246. Protocol stack 1224 includes a presentation layer media negotiation module 1248, a call control module 1250, one or more audio codecs 1252 and one or more video codecs 1254. Applications 1222 may be able to create maintain and/or terminate communication sessions with any of devices 1207 by way of AP 1206. Typically, applications 1222 may activate any of the SAP, SIP, RTSP, media negotiation and call control modules for that purpose. Typically, information may propagate from the SAP, SIP, RTSP, media negotiation and call control modules to PHY module 1226 through TCP module 1238, IP module 1234, LLC module 1232 and MAC module 1230.

It would be apparent to one skilled in the art that elements of the electronic device 1204 may also be implemented within the AP 1206 including but not limited to one or more elements of the protocol stack 1224, including for example an IEEE 802.11-compatible PHY module, an IEEE 802.11-compatible MAC module, and an IEEE 802.2-compatible LLC module 1232. The AP 1206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 1204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, it would be evident that a GSS-GEAP according to an embodiment of the invention may be implemented solely upon an electronic device 1206 or that the electronic device 1206 may access a GSS-GEAP upon a remote server via the network 100. Optionally, a user may exploit a GSS-GEAP upon their smartphone (an electronic device 1206) which provides LiveSketch™ functionality allowing the user to sketch concepts, objects, designs etc. as they move around or as they arise to the user. Subsequently, these sketches may be transferred via a wired connection, wireless connection, or via the network 100 to another electronic device 1206 which supports a graphics design package allowing the user to import and manipulate their initial sketch further and exploit the full features of the graphics design package. Alternatively, the GSS-GEAP providing "sketching" functionality would allow a user to generate doodles, designs, cartoons, etc. upon their PED or FED and post these to a SOME or SOCNET as well as to their remote cloud drive etc. Accordingly, a first user could generate a sketch which it then taken by a second user and amended/edited etc. and then returned or distributed for comment etc. with ease and portability as the vector graphics generated may be ported as a scalable vector graphics image thereby allowing it to be supported on any web browser of any electronic device.

Optionally, the input device is a mouse, a stylus upon a tablet, a finger upon a touchscreen, etc. although it can be other portions of the human body to support interfaces for those with disabilities. Alternatively, a user may exploit a wearable device or smart fabric to "draw" their sketch.

Figure 2:
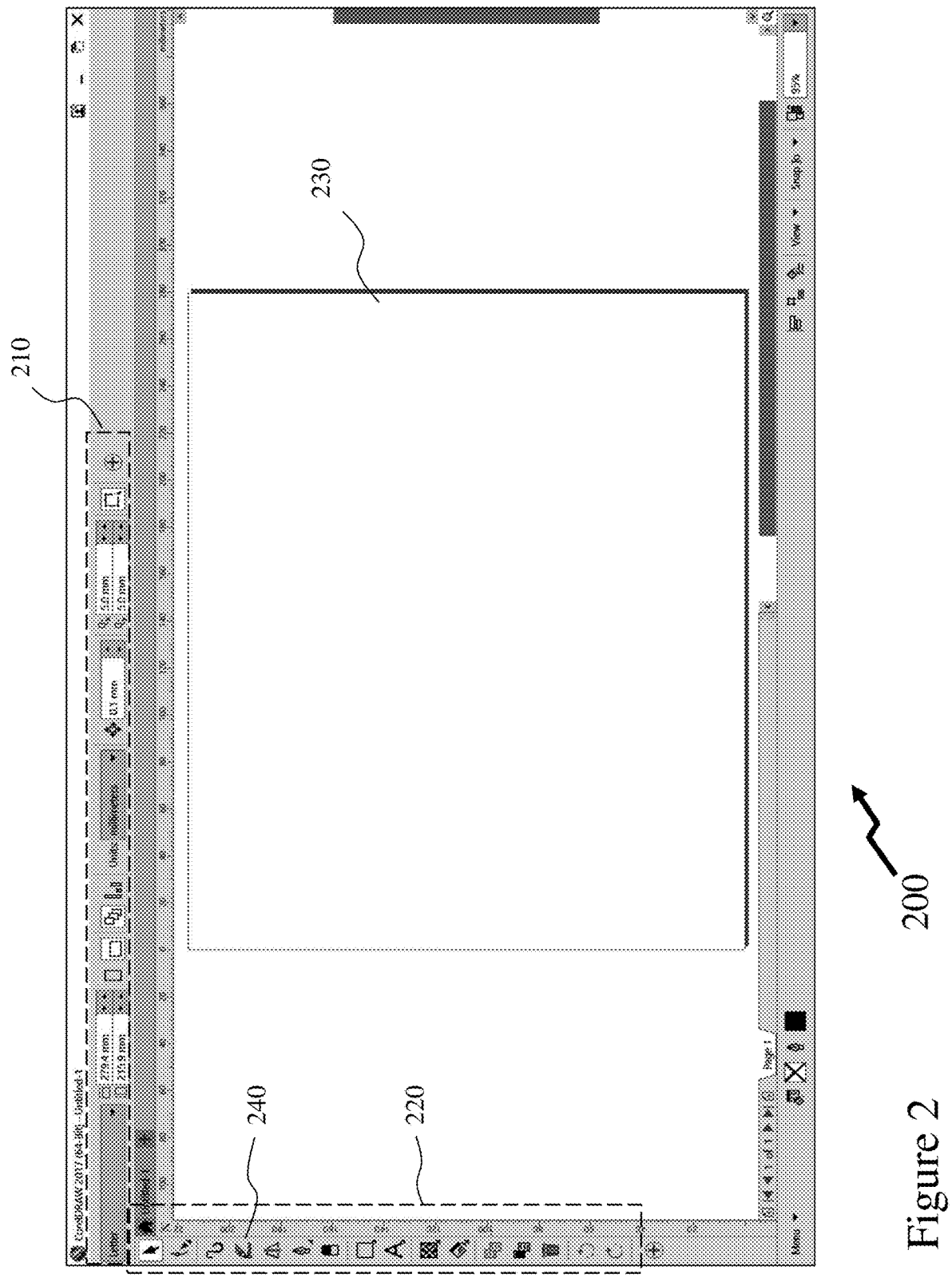
FIG. 2 depicts an exemplary home screen of a digital graphics editor, digital painting, application supporting embodiments of the invention.

Now referring to FIG. 2 there is depicted a home screen 200 of a digital graphics editor, digital painting, application, the GSS-GEAP, according to an embodiment of the invention, e.g. CorelDRAW™ 2017. Accordingly, within the home screen 200 a user has opened a window 230, which may for example be untextured, textured to mimic a paper, canvas, or other surface for "drawing" upon. Optionally, a texture may be applied prior to the user beginning work, during their work, or upon its completion. The user can define the dimensions of their virtual "paper" through first menu bar 210 as well as selecting imperial/metric dimensions, grid settings, and resolution of actions upon the virtual "paper" associated with the window 230. Similarly, the user can select and apply effects through the second menu bar 220 including employing multiple layers with different effects and/or properties, different illuminations, etc. as known within the art. The user may also be presented with a series of menus that can be manipulated, docked, undocked and moved with respect to the home screen 200 and allowing the user to select, adjust, modify, add, delete, and control various aspects of their interaction with the GSS-GEAP. As displayed, the second menu bar 220 provides menu options from top to bottom of:

Pick tool for selecting, positioning, or transforming elements;

Editing a curve object or text character by manipulating nodes;

Artistic Media tool allowing the addition of artistic brush, spray, and calligraphic effects by using freehand strokes;

LiveSketch™ 240 allowing the user to naturally and fluidly sketch with intelligent stroke adjustment (i.e. access the tools and features of embodiments of the invention described and depicted below in respect of FIGS. 3 to 13 respectively);

Smart Drawing tool which allows the user to convert freehand strokes to basic shapes or smoothed curves (e.g. draw a closed object and select it to be a square or a circle for example);

Pen tool allowing the user to draw curves in segments and preview as they draw;

Eraser tool to remove unwanted areas within a drawing;

Rectangle tool to draw squares and rectangles by clicking and dragging within the drawing window;
Text tool to add and edit paragraph and artistic text;
Transparency tool to partially reveal image areas underneath an object by exploiting the properties of layers;
Interactive Fill tool allowing the user to dynamically apply and/edit the current fill to an object in the drawing window;
Copy a current object into memory;
Paste an object stored in memory into the drawing window;
Delete an object selected within the drawing window;
Undo;
Redo; and
Add menu bar options.

Figure 3A:
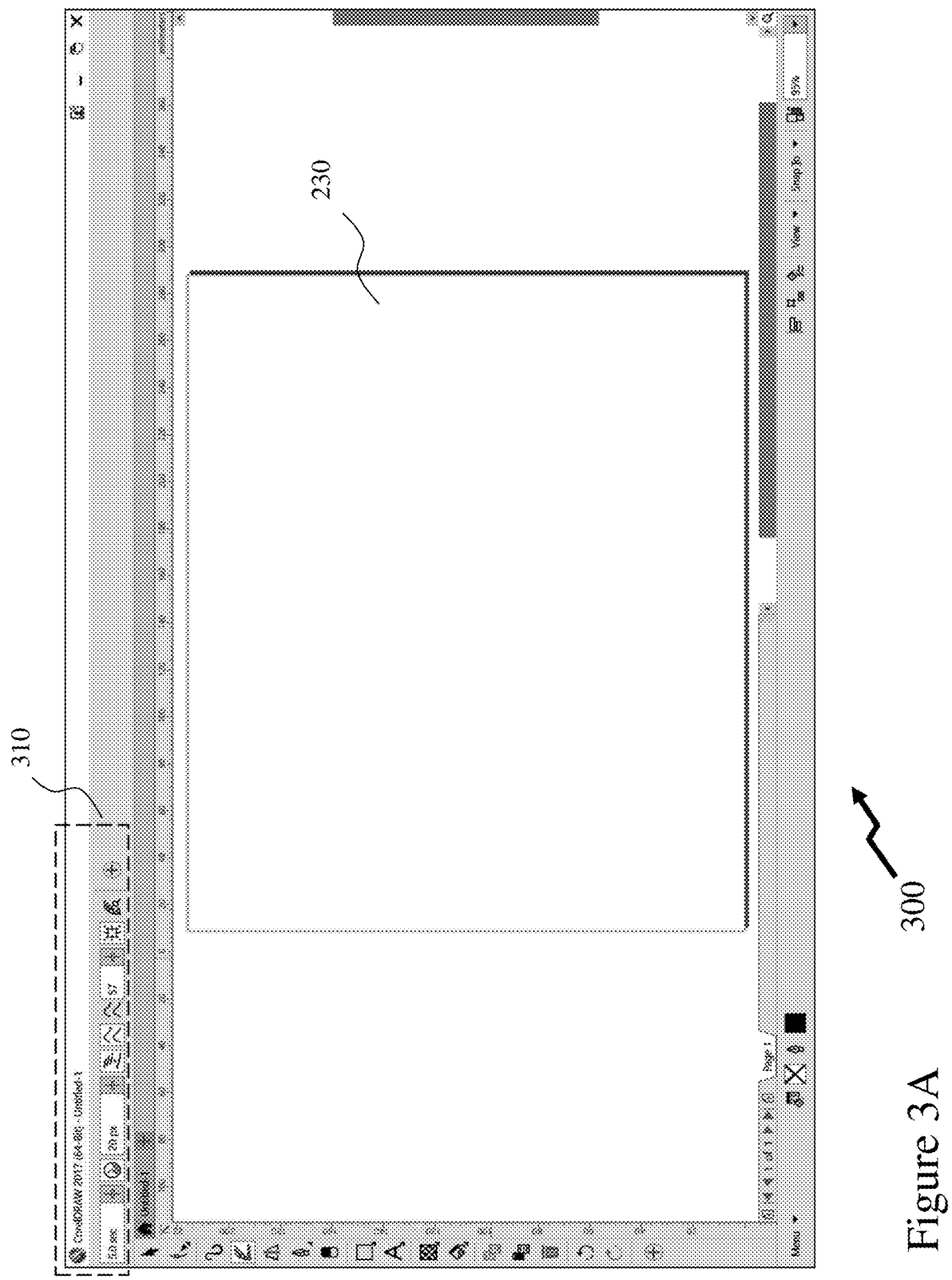
FIG. 3A depicts the exemplary home screen of the digital graphics editor, digital painting, application according to the embodiment of the invention depicted in FIG. 2 with a LiveSketch™ tool according to an embodiment of the invention enabled.

Each of the menu options within the second menu bar 220 when selected results in the first menu bar 210 being modified to reflect the selected option such as depicted in FIG. 3A wherein the LiveSketch™ 240 option was selected resulting in menu bar 310 being displayed within the screen 300. The selected option is identified to the user for example by colour changes of the selected and unselected options such as depicted in FIG. 3A. It would be evident that other menus, sub-menus etc. may be presented to the user in response to actions with the menu bar options, the window 230, or the screens 200 and 300 respectively by left and or right click options for example on a mouse or through actions with a stylus, voice, eye tracking, gestures, touchscreen, tablet etc.

Figure 3B:
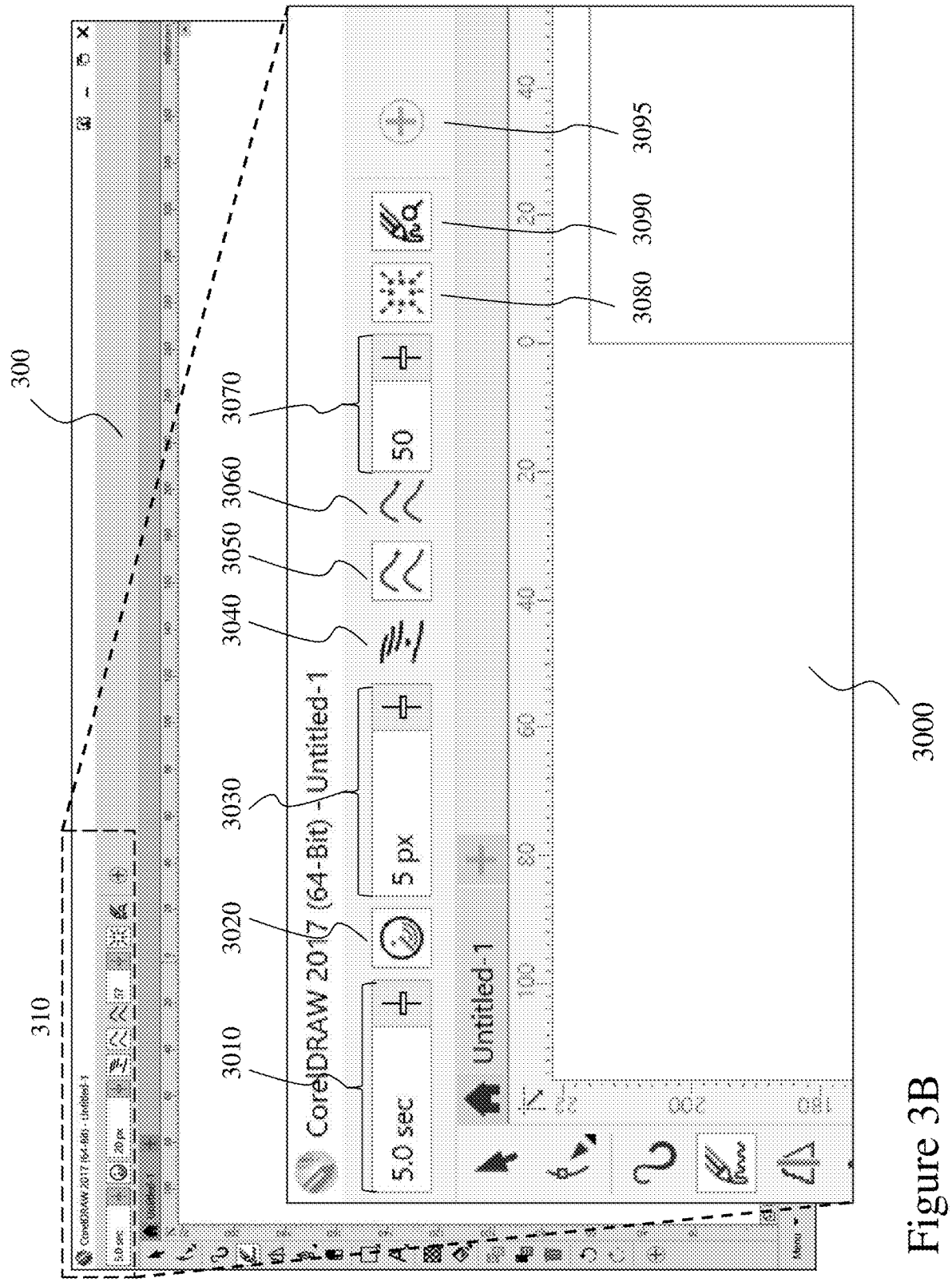
FIG. 3B depicts the enabled LiveSketch™ tool according to an embodiment of the invention within the exemplary home screen of the digital graphics editor, digital painting, application according to the embodiment of the invention depicted in FIG. 3A in more detail.

Referring to FIG. 3B the screen 300 of FIG. 3A is presented with an expanded section 3000 relating to the tool bar 310 indicating the options presented through the graphical user interface (GUI) to the user within an embodiment of the GSS-GEAP providing the screen 300. As depicted, these are:
Timer 3010, allowing the user to set the delay before strokes are adjusted and become curves by either slider or numeric entry of the time;
Include 3020, allowing the user to add, "include", curves which already exist to a sketch;
Distance 3030, allowing the user to set the distance at which existing curves are added to a sketch by either slider or numeric entry of the distance;
Create 3040, allowing the user to create a single curve from strokes drawn within the specified time frame;
Enforce 3050, allowing the user to enforce continuity to ensure that previous curves retain their original flow if possible;
Curve 3060, allowing the user to adjust the smoothness of the resulting curve;
Smoothing 3070, wherein the degree of smoothing applied can be set by the user by either slider or numeric entry;
Box 3080, which allows the user to select whether to show or hide a bounding box when using the curve tools within LiveSketch™;
Preview 3090, allowing the user to select a preview mode wherein the user can elect to preview the resulting curve as they sketch; and
Quick customize 3095, allowing the user to add frequently used menu options to or remove infrequently used menu options.

Timer 4010 may, for example, be set within the range $0 \leq Timer \leq 5$ s with increment of 0.1 s although it would be evident that different minimum, maximum, and increment values may be employed either as defaulted through the LiveSketch™ tool or user selection. Distance 4030 may, for example, be set within the range $0 \text{ px} \leq D \leq 40$ px with increment of 5 pixels, although it would be evident that different minimum, maximum, and increment values may be employed either as defaulted through the LiveSketch™ tool or user selection. Smoothing 4070 may, for example, be set within the range $0\% \leq D \leq 100\%$ with increment of 1%, although it would be evident that different minimum, maximum, and increment values may be employed either as defaulted through the LiveSketch™ tool or user selection.

Figure 4:
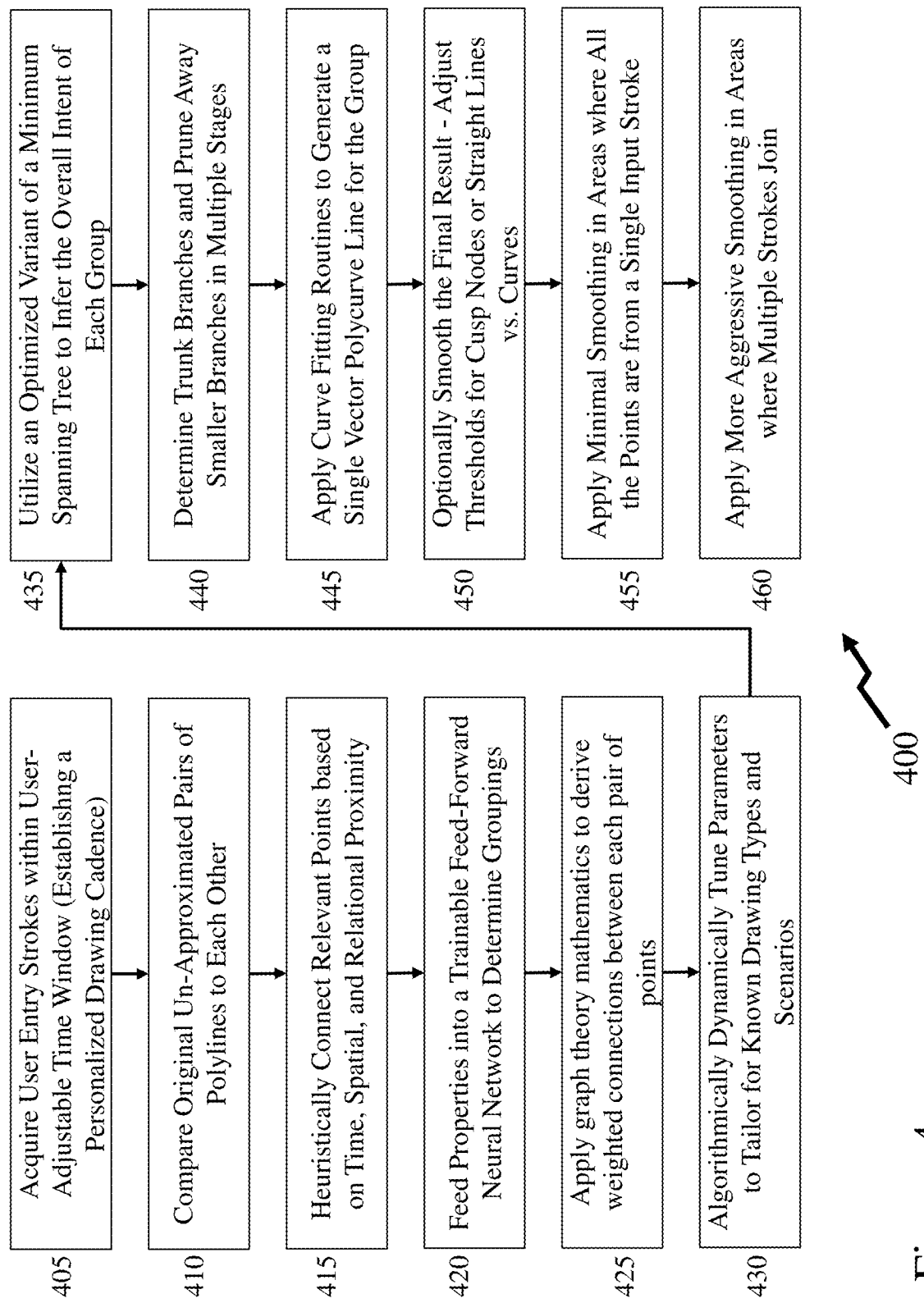
FIG. 4 depicts an exemplary process flowchart for a LiveSketch™ tool according to an embodiment of the invention.

FIG. 4 depicts an exemplary process flowchart for a LiveSketch™ tool according to an embodiment of the invention comprising steps 405 to 460. These steps comprising:
Step 405: Acquire user entry strokes within a user-adjustable time window (allowing a personalized drawing cadence (style) of the user to be established);
Step 410: Compare original un-approximated pairs of polylines to each other;
Step 415: Heuristically connect relevant points based on time, spatial, and relational proximity;
Step 420: Feed properties into a trainable feed-forward neural network to determine groupings;
Step 425: Apply graph theory mathematics to derive weighted connections between each pair of points;
Step 430: Algorithmically dynamically tune parameters to tailor for known drawing types and scenarios;
Step 435: Utilize an optimized variant of a minimum spanning tree to infer the overall intent of each group;
Step 440: Determine trunk branches and prune away smaller branches in multiple stages;
Step 445: Apply curve fitting routines to generate a single vector poly-curve line for the group;
Step 450: Optionally smooth the final result, wherein thresholds may be adjusted for cusp nodes, for example, or straight lines versus curves;
Step 455: Apply minimal smoothing in areas where all the points are from a single input stroke; and
Step 460: Apply more aggressive smoothing in areas where multiple strokes join.

Optionally, the curve fitting routines in step 445 may be proprietary to the provider of the GSS-GEAP according to an embodiment of the invention supporting LiveSketch™ features according to an embodiment of the invention or they may be those known within the prior art. Accordingly, as the user sketches LiveSketch™ as embodied within embodiments of the invention with one or more GSS-GEAPs continuously analyzes the properties, temporal order and spatial proximity of the input strokes made by the user, adjusts them and convert them into curved vector objects. Accordingly, the exemplary process flow described and depicted with respect to FIG. 4 may be considered as being at a macro-level three separate steps. These being:
intelligently "grouping" the users input strokes into clusters;
"merging" the strokes from each cluster into a single ordered set of points; and
"fitting a smooth curve" over the set of points.

Considering the first step of "grouping" then once the user places the GSS-GEAP into sketch mode, LiveSketch™, the user's input curves are represented as polylines. If there are more than two curves within the sketching mode, pairs of curves (original, non-approximated polyline strokes) are compared to each other and a set of properties are calculated, which describe how related these curves are to one another. These properties describe how close the curves are to each other, how misaligned they are and how likely it is that the two curves are a continuation of one another.

These properties are then fed into a neural net, which has a three-layer topology with three inputs, one hidden layer (comprised of a predetermined number of neurons) and a single output (topology is subject to change in light of more recent training data). The output of the neural net is a Boolean value that indicates whether the properties of a pair of curves are suitable for them to be grouped together.

Training may be performed through a special build or initial utilization of the tool which includes a user interface (UI) and functionality specifically for training purposes. When in training mode, upon the completion of a sketch, the tool will highlight two curves and ask you whether you would consider these two curves to be in a group or not. This data can be saved in a file. According, the user may, for example via a button on the property bar, reset the neural net and retrain it using the loaded training data and a pane is included to view the weights of neurons and bias nodes, the best error during training and the number of iterations it took to train the neural net to an error value below the specified threshold.

After the neural net has grouped the curves, the curves are analysed for any that start together but spread apart rapidly as these are then considered separate groups and split accordingly.

Accordingly, once all the lines have been grouped appropriately the next step is to create a single new line to replace each group of lines. According to an embodiment of the invention the algorithm essentially uses the group of lines drawn by the user to infer the overall intent for what single line the user would want in that area. In order to do this correctly in the highest number of cases the algorithm starts by looking at all of the lines drawn where each line is represented by a large set of points and for each point it notes the following four pieces of information:

Which line did this point come from?
Within the line it came from, how far along the line is this point (in number of points)?
Within the line it came from, what is the angle of the tangent of the point (in range 0° to 180°)?
Where is this point located on the canvas?

Next, a complete graph is created where each point is a vertex and the weights for the edges between each pair of vertices is calculated based on the four pieces of information listed above. There are also several tuning parameters involved in these calculations which govern, among other things, the relative importance of all these pieces of information. The algorithm needs to vary these parameters dynamically in order to get a good final result for all types of drawing styles. For example, the algorithm would choose different tuning parameters if a cluster contains two lines that are overlapping each other than when it contains two lines that are extensions of one another as in the case of an artist drawing in a "chicken scratch" style.

Another example of this is varying these tuning parameters when the user draws a "folded stroke". Within an embodiment of the invention a folded stroke may be handled to take the user's input stroke and essentially "unfold" it to a single stroke before the grouping step happens. The "unfolding" to the single input stroke is performed with an embodiment of the invention by running the merging algorithm on only this one stroke (with tweaked formulas). The output is then passed on to be grouped, merged with other strokes and have a curve fitted to it as before. Accordingly, as noted supra the software may treat a folded stroke with a narrow separation between strokes as one to be "unfolded" for determining the overall user intent or with an increased separation treat the stroke as the user's intent, e.g. creating a spiral, spring-like element in their line drawing.

From the complete graph, the next step is to create a minimum spanning tree. Ideally, at this point the tree would have a single long and dominant branch or "trunk" and only a few small branches coming off of this trunk. Selection is therefore straight-forward which is desirable because at this stage the tree is analysed to determine which branch should be considered to be the trunk and the remaining smaller branches are pruned away. This leaves just this single trunk branch to be passed on to have a vector curve fit to it to be the final output for this group of curves. If the tree has multiple trunks then a routine may be executed to present these, one vector curve fitted, as options from which the user chooses. Alternatively, a weighting may be applied based upon number of dominant branches, branches, leaves etc. such that the GSS-GEAP automatically selects a trunk from the multiple potential trunks.

Once the curves have been merged together, the chosen set of points needs to be converted into a clean vector poly-curve line. This curve fitting may provide options to smooth the final result and adjust the thresholds at which cusp nodes or straight lines are used instead of curves. Additionally, the flowchart and embodiment depicted in FIG. 4 exploits the application of more aggressive smoothing in areas where multiple strokes are joining together and lessens the smoothing applied in areas where there all the points are from a single input stroke.

Accordingly, within the embodiments of the invention described below and in respect of FIGS. 5 to 13 a user may select features and functionalities according to embodiments of the invention and establish aspects of these at different settings through such menus and others as would be evident to one of skill in the art.

Accordingly, as will be evident to one of skill in the art embodiments of the invention, referred to as LiveSketch™, exploits a mathematical solution established by the inventors that generates editable vector curves dynamically from a user's real time digital sketch input allowing a user to quickly and intuitively create line drawings and sketches. The LiveSketch™ methodology comprises the steps of:
- timer-based recognition of user "sketch" generation;
- acquiring data points during the user's "sketch" generation;
- analyze multi-dimensional properties of each acquired point in a large data set to infer overall intent;
- generate an output; and
- exploit smoothing routines to further improve final results.

Importantly, LiveSketch™ according to embodiments of the invention can be set to provide additional features including, but not limited to:
- Handle or ignore very complex strokes with an arbitrary number of loops;
- Dynamically tune control parameters for discrete known drawing types; and
- Leverage proprietary smoothing routines to further improve final results.

For example, the handling of very complex strokes may mean that the user's actions are taken as "literal" direction of intent in that a continuous series of motions in one direction and then reversing forming loops are intended rather than being a quick user manner of defining multiple strokes (wherein the connectivity between these strokes is ignored). This decision on to handle or ignore may be set through control settings of the GSS-GEAP or may be dynamically established by the GSS-GEAP from default settings or user learnt behaviour. For example, default GSS-GEAP settings may be that a series of loops within a defined footprint laterally are to be taken as user preference for drawing a single stroke quickly rather than a spiral or another curved stroke shape the user wishes to generate.

Figure 5:
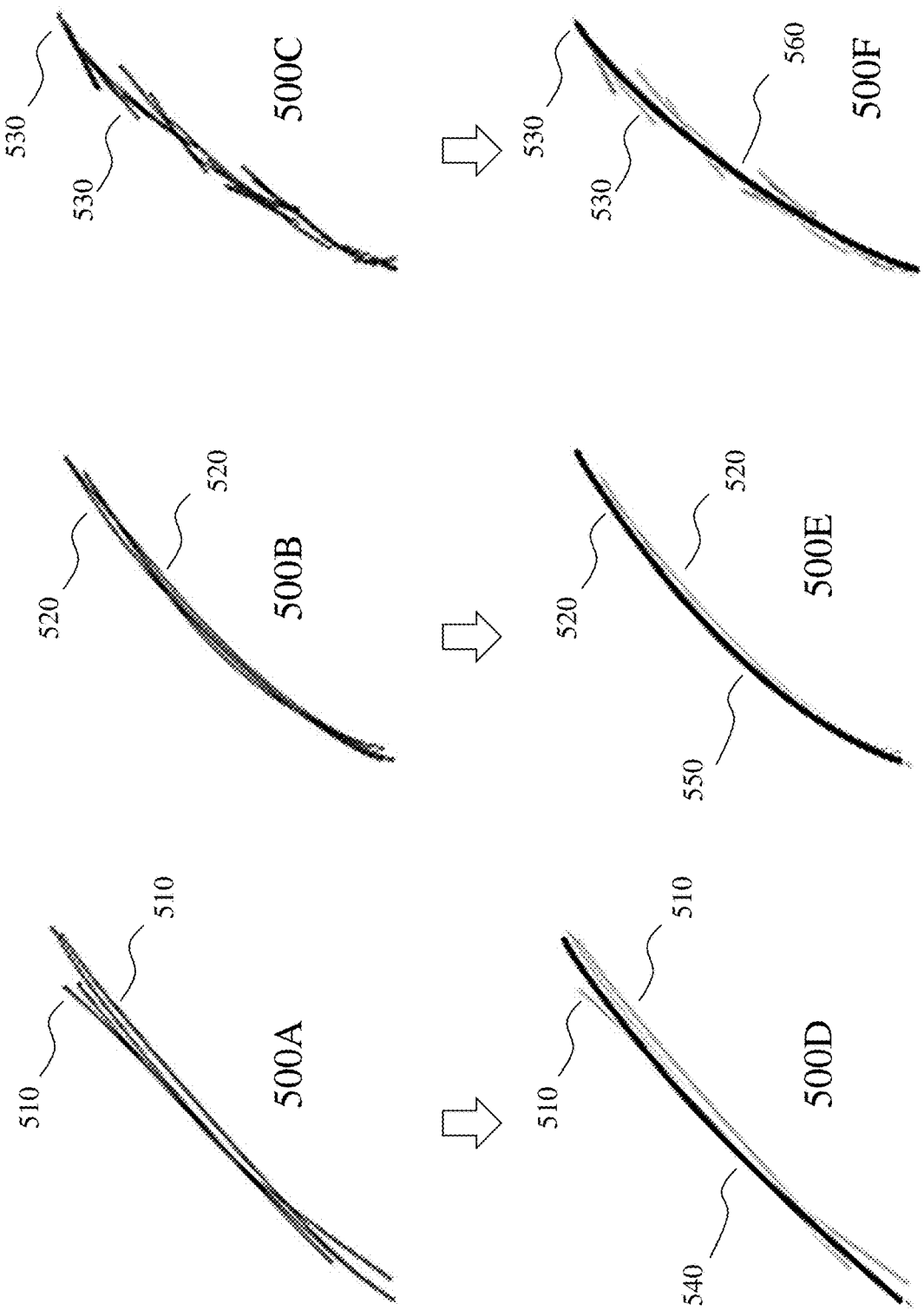
FIG. 5 depicts strokes before (top) and after (bottom) stroke adjustment entered using different techniques with the enabled LiveSketch™ tool according to an embodiment of the invention.

Embodiments of the invention may support most common drawing styles such as those depicted in the upper portion of FIG. 5 which are then processed, or stroke adjusted to yield the resulting curves (black lines) as depicted in the lower portion of FIG. 5 together with their input strokes (grey lines). Accordingly, first to third images 500A to 500C depicts:

First image 500A: discrete overlapping strokes 510;
Second image 500B; folded strokes 520 (scribbling back and forth across "paper" with lines doubling back on each other); and
Third image 500C; "chicken scratch" 530 comprising short lines 530 drawn rapidly one after the other to build up long lines and large forms.

Accordingly, fourth to sixth images 500D to 500F depict the resulting single curves 540, 550, and 560 respectively for the first to third images 500A to 500C respectively.

As noted supra the settings within the LiveSketch™ functionality within the GSS-GEAP according to embodiments of the invention can specify the time it takes to activate stroke adjustment after they have drawn one or more strokes. For example, if the user sets the timer to one second and make a few strokes, stroke enhancement will take effect one second after they finish drawing the strokes. The timer therefore creates a temporal window within which the discrete strokes that the user makes are analysed and converted into curves. A user can experiment with the timer to find a setting that best matches their sketching speed and style. Accordingly, setting a short delay time to creates curves right away and develops a sketching cadence. Alternatively, increasing the delay time to 5 seconds and taking advantage of the live preview allows the user to see their input strokes and build upon them.

Figure 6:
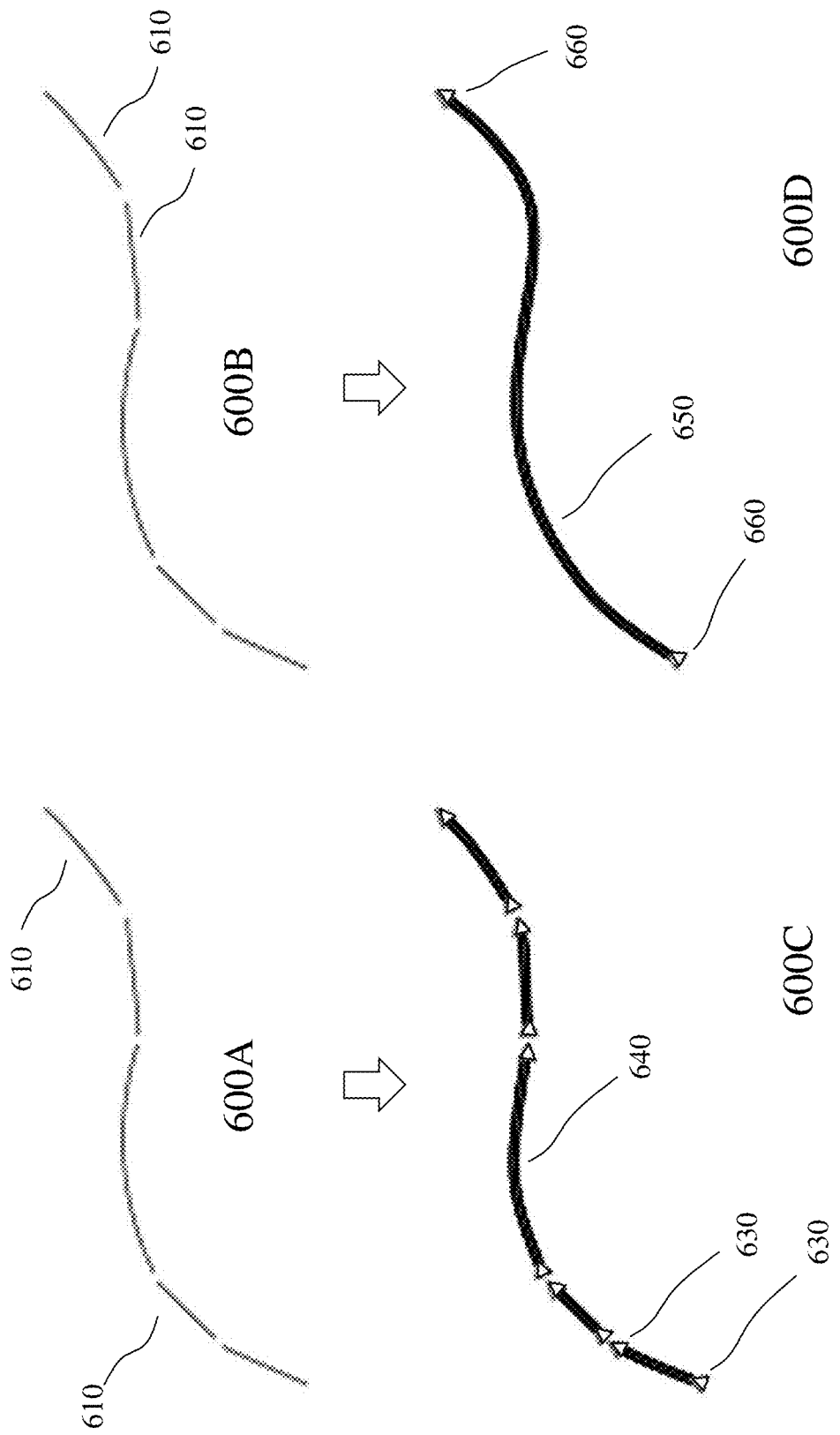
FIG. 6 depicts the effect of timer setting on the conversion of user strokes to converted adjusted strokes within an enabled LiveSketch™ tool according to an embodiment of the invention.

Within embodiments of the invention the user can reset the timer and adjust the strokes before the specified time has elapsed as well as being able to delete strokes before they have been adjusted. Referring to FIG. 6 there is depicted the effect of timer setting on the conversion of user strokes to converted adjusted strokes within an enabled LiveSketch™ tool according to an embodiment of the invention. Accordingly, first and second images 600A and 600B depict the same sequence of lines 610 entered by a user where third and fourth images 600C and 600D depict the results with the time set to 0 seconds and 1 second respectively. In third image 600C with t=0 s the successive strokes are converted into discrete curves denote by nodes 630 and curves 640. In fourth image 600D with t=1 s the successive strokes are joined into a single curve 650 with only two nodes 660.

Figure 7:
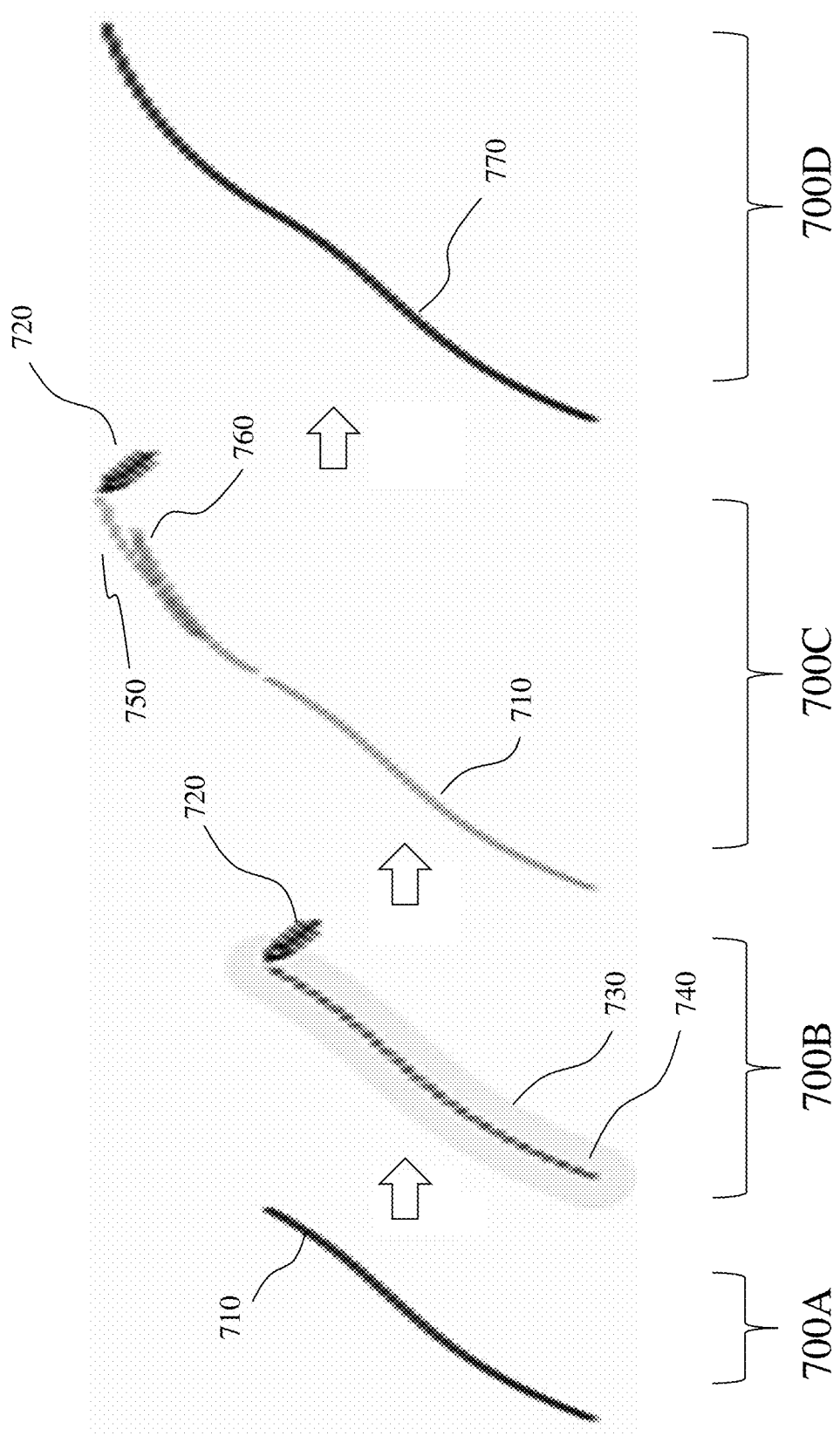
FIG. 7 depicts the margining of an existing stroke with a new stroke within the proximity of the existing stroke within enabled LiveSketch™ tool according to an embodiment of the invention.

As the sketch/composition/drawing progresses then the user may wish to re-draw existing lines to change their position and shape or simply to refine them. Exploiting embodiments of the invention such as LiveSketch™ within GSS-GEAPSs according to embodiments of the invention allows a user to modify existing curves by including them into their sketch as new input strokes. This is achieved based the user specifying the width of an editable area around previously drawn curves. Now, when the user sketches again within this area, the existing curves are processed along with the new input strokes and are accordingly readjusted. If the user sketches outside the specified distance, then their input strokes are added as new objects. This is depicted in FIG. 7 wherein in first image 700A an existing stroke 710 is depicted. Within second image 700B this existing stroke 710 is depicted as line 740 with the editable area 730 visible around it for the defined editable width set by the user. Hence, the placement of their mark making tool 720, e.g. stylus, cursor, finger, etc., within the editable area 730 means that new strokes 750 and 760 in third image 700C are combined with the existing stroke 710 to form final stroke 770 as depicted in fourth image 700D.

Figure 8:
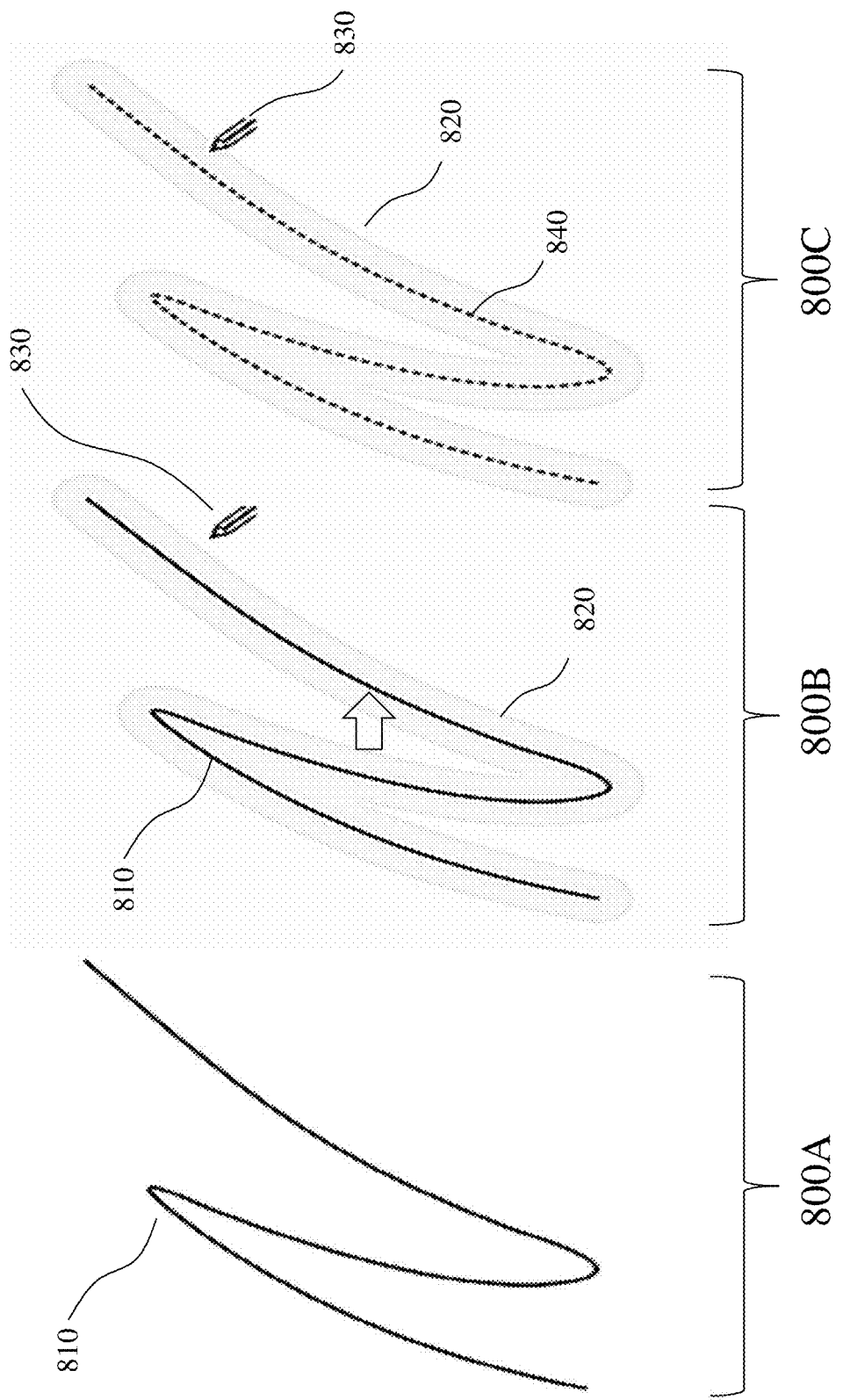
FIG. 8 depicts the effect of moving a pointer within a digital graphics editor, digital painting, application according to the embodiment of the invention to within the editable area of an existing curve with an enabled LiveSketch™ tool according to an embodiment of the invention.

Referring to FIG. 8 there is depicted the effect of moving a pointer within a digital graphics editor, digital painting, application according to the embodiment of the invention to within the editable area of an existing curve with an enabled LiveSketch™ tool according to an embodiment of the invention. In first image 800A in FIG. 8 a line 810 is depicted in normal display mode whereas in second image 800B in FIG. 8 a second display mode is depicted wherein the line 810 is shown with the editable area 820. Optionally, the editable area 820 may be turned on/off for display at all times or may be selectively displayed such as when a mark making tool 830 is within a predetermined distance of the editable width, e.g. a multiple of the editable width. If the mark making tool 830 is then moved within the editable width the line 810 is displayed as modified line 840 indicating to the user that the selected line can be modified.

Figure 9:
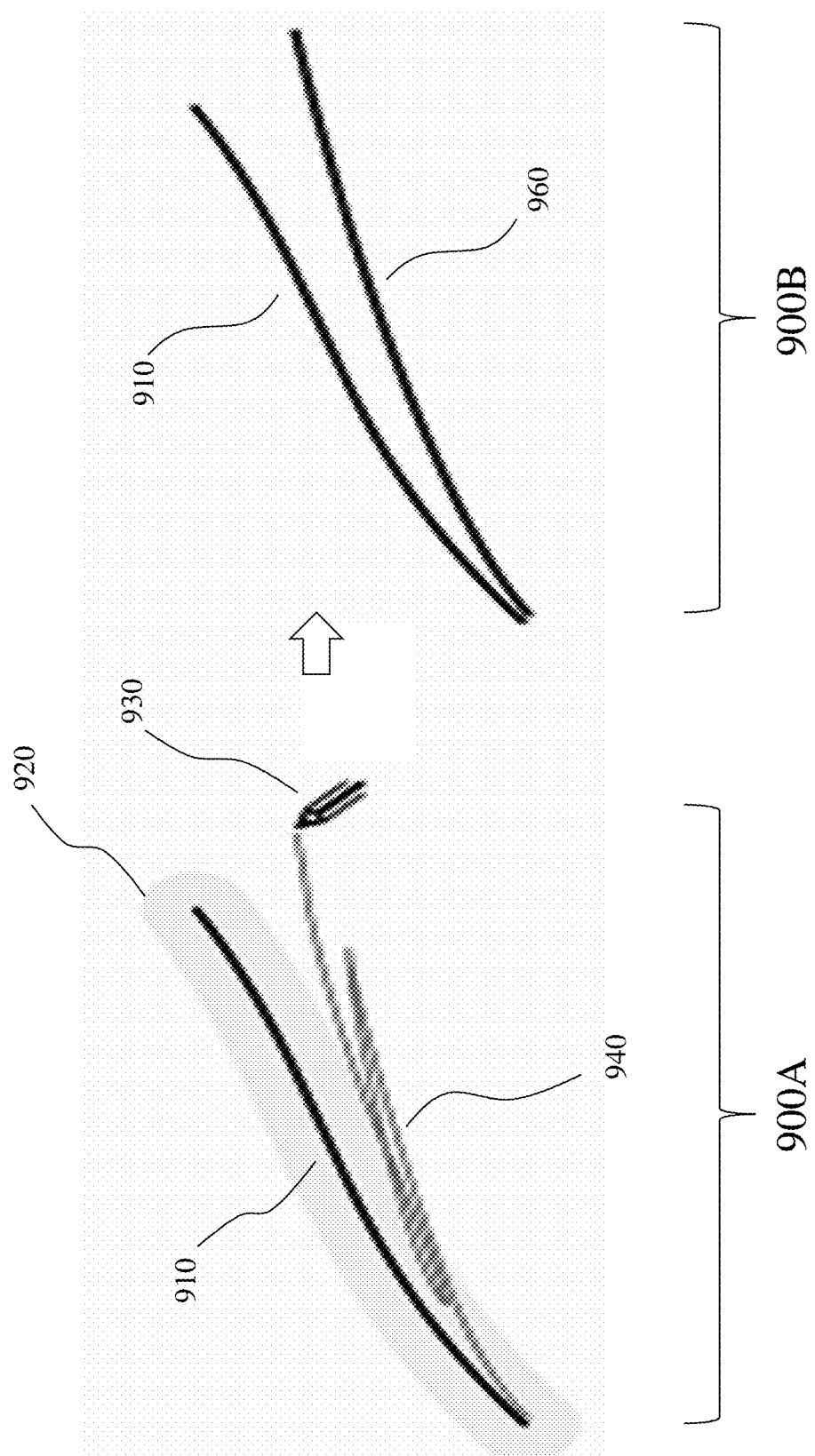
FIG. 9 depicts the effect of disabling proximity-based stroke grouping within a digital graphics editor, digital painting, application according to the embodiment employing an enabled LiveSketch™ tool according to an embodiment of the invention.

Optionally, if the user needs to sketch very close to existing lines or draw over strokes to reinforce them, then the user can disable proximity-based stroke adjustment temporarily or permanently so that strokes are added as separate objects. Such an effect is depicted in FIG. 9 wherein the effect of disabling proximity-based stroke grouping within a digital graphics editor, digital painting, application according to the embodiment employing an enabled LiveSketch™ tool according to an embodiment of the invention is depicted. Accordingly, a first line 910 is depicted where the editable area 920 is displayed but is disabled. Accordingly, with the editable area 920 disabled the user's subsequent sketching 940, depicted in first image 900A, with mark making tool 930 does not trigger merging with/adjustment of first line 910 but rather, as depicted in second image 900B, the generation of second line 960.

Figure 10:
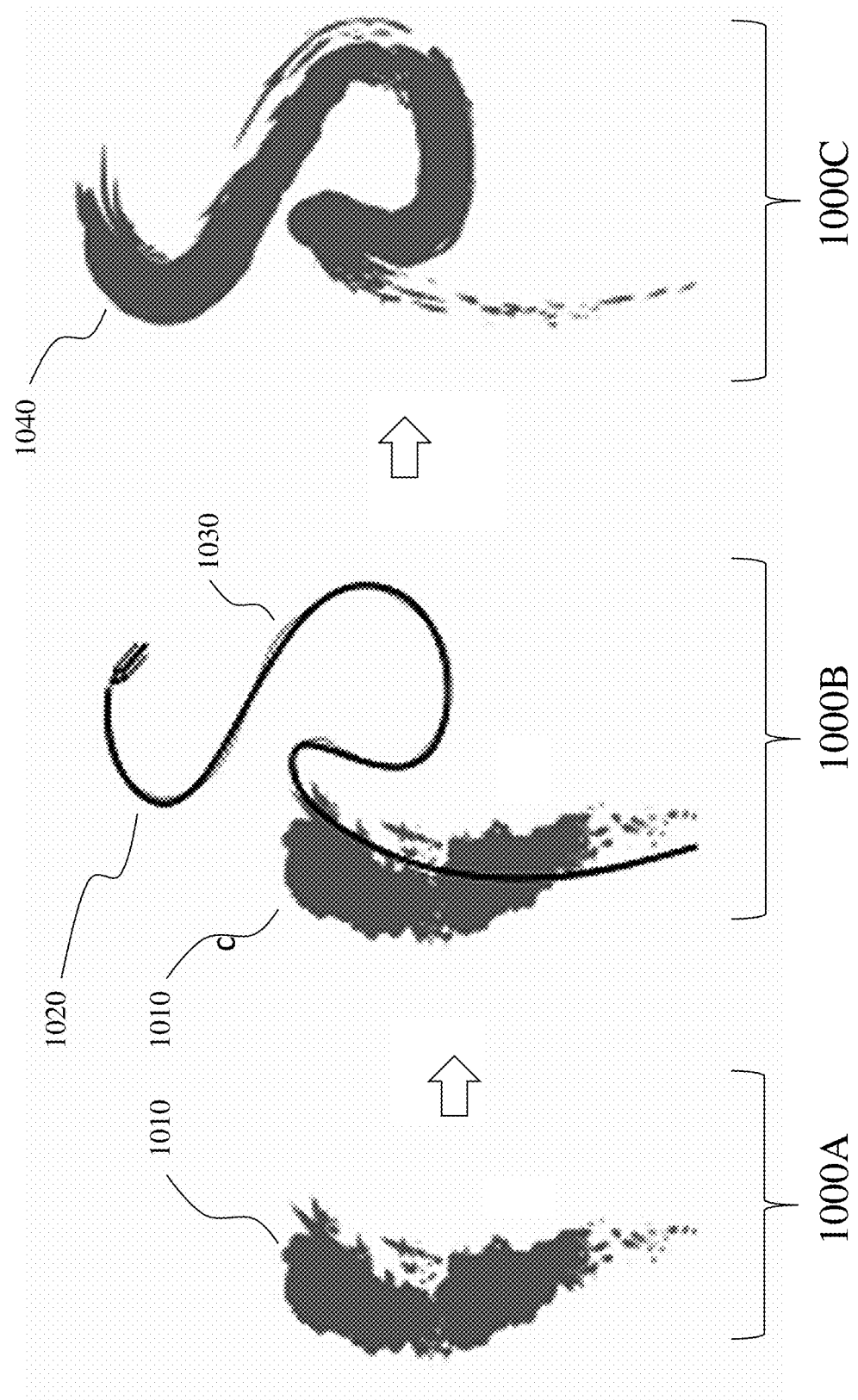
FIG. 10 depicts the effect within a digital graphics editor, digital painting, application according to the embodiment employing an enabled LiveSketch™ tool according to an embodiment of the invention in combination with an Artistic Media tool such that a subsequently drawn stroke within the proximity threshold of an existing stroke takes on the properties of the existing curve.

FIG. 10 depicts the effect within a digital graphics editor, digital painting, application according to the embodiment employing an enabled LiveSketch™ tool according to an embodiment of the invention in combination with an Artistic Media tool such that a subsequently drawn stroke within the proximity threshold of an existing stroke takes on the properties of the existing curve. Accordingly, in first image 1000A an existing object 1010 is depicted. Subsequently, as depicted in second image 1000B a curve 1020 generated according to an embodiment of the invention from a plurality of strokes 1030 may inherit the properties of the existing object 1010 resulting in final line 1040 as depicted in third image 1000C. Optionally, the existing object 1010 may be defined by the user prior to drawing the strokes 1030 or it may be automatically selected based upon rules such as being within the current layer, within a selected layer, etc.

Figure 11:
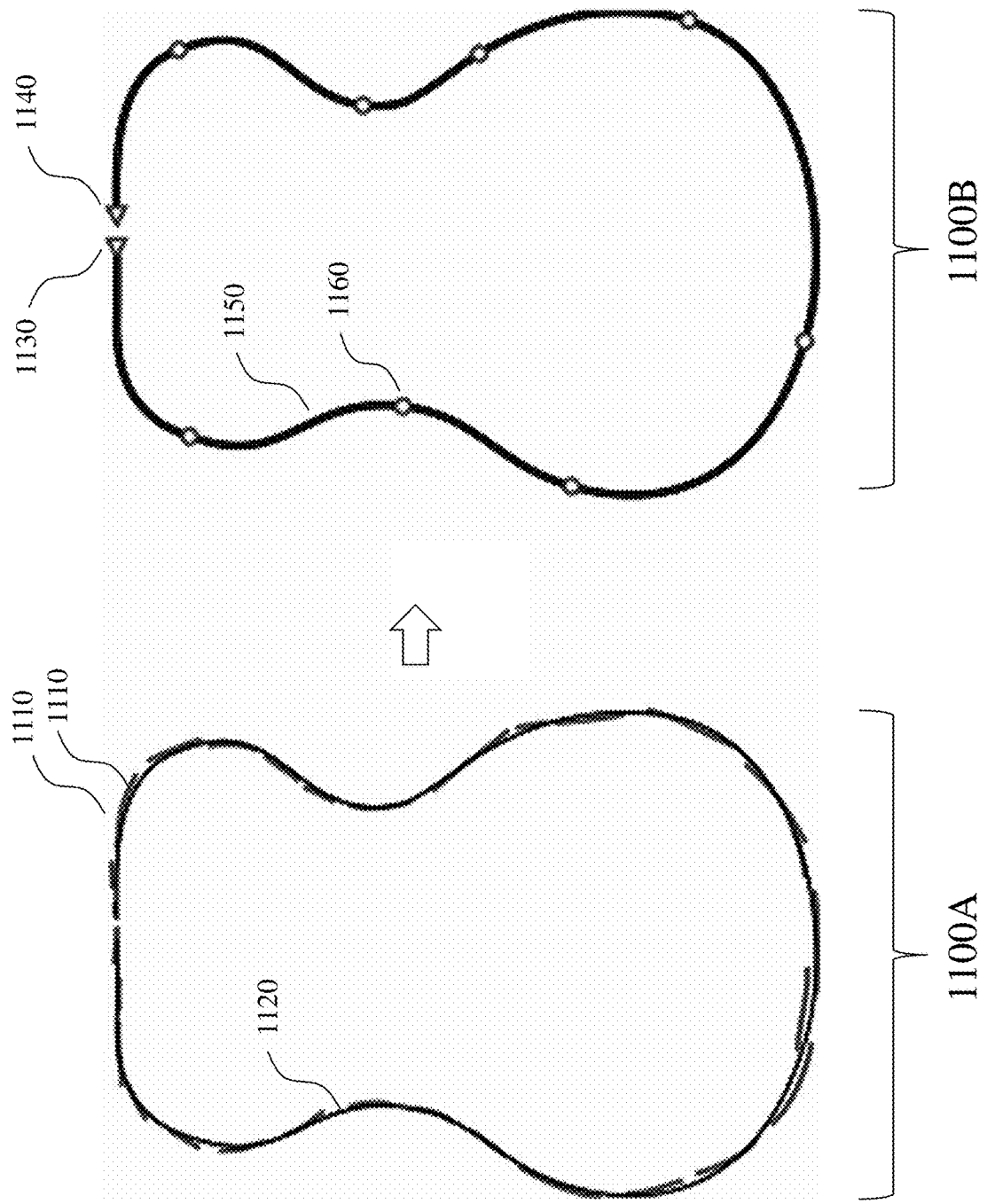
FIG. 11 depicts the creation of an object from multiple strokes joined into a single curve within an enabled LiveSketch™ tool according to an embodiment of the invention.

It would be evident that some users may which to define the entire extent of a shape or an object with a single curve. It would be evident that doing so can be difficult, however, to maintain smooth lines for a long distance or over a long curve without lifting the stylus off the tablet or releasing the mouse button etc. Accordingly, an enabled LiveSketch™ tool according to an embodiment of the invention within a GSS-GEAP according to an embodiment of the invention can solve this by allowing the user to create a seamless curve from a series of strokes that they draw within the specified time interval even though each stroke is discrete and discontinuous to others that ultimately combine to form the single seamless curve. FIG. 11 depicts such a creation of an object from multiple strokes joined into a single curve within an enabled LiveSketch™ tool according to an embodiment of the invention wherein in first image 1100A in FIG. 11 the discrete strokes 1110 are depicted together with the resulting single curve 1120 which once the timer has expired is treated as a single object in second image 1100B in FIG. 11 denoted by nodes 1160, curve 1150 and start/end points 1130/1140 respectively.

Figure 12:
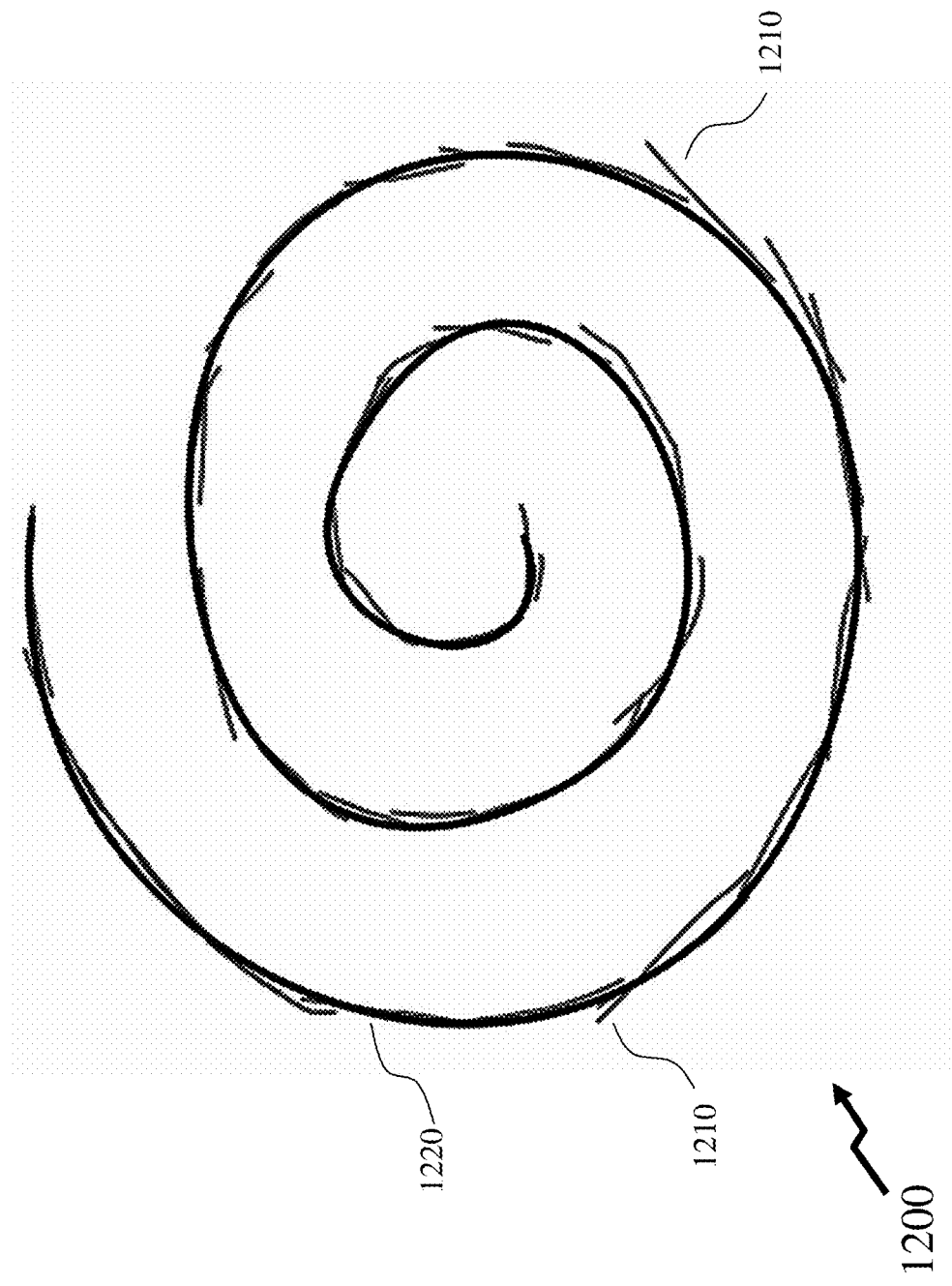
FIG. 12 depicts a preview mode allowing a user to view an adjusted stroke before the delay time has elapsed together with their input strokes within an enabled LiveSketch™ tool according to an embodiment of the invention.

As a user generates more and more of their sketch and they start to improve the accuracy and appearance of the lines then they may need to erase existing curves or portions of curves. These may be deleted using techniques known with the prior art according to the type of curve implemented. For example, some types of curves, e.g. Bezier curves, may need specific treatment to erase portions of the curve without triggering regeneration of the remaining portion(s) etc. Within embodiments of the invention the LiveSketch™ according to embodiments of the invention may presented a representation of the adjusted stroke as the user is drawing. Optionally, this can be turned off. Referring to FIG. 12 the preview mode allowing a user to view an adjusted stroke before the delay time has elapsed together with their input strokes within an enabled LiveSketch™ tool according to an embodiment of the invention is depicted in image 1200 where the sketching lines 1210 are depicted in a spiral together with the resulting curve 1220.

Figure 13:
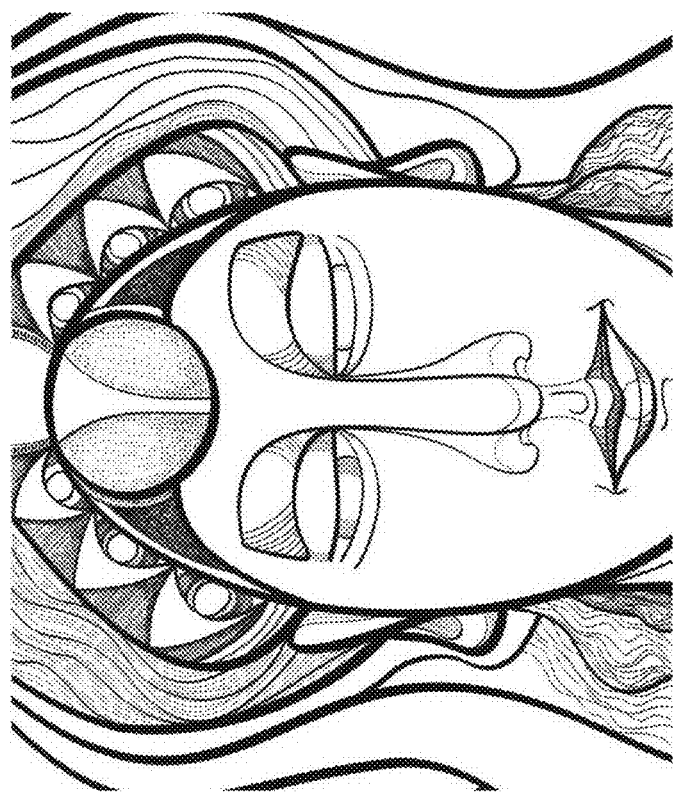
FIG. 13 depicts exemplary a concept sketch and an artwork created by Andrew Stacey within enabled LiveSketch™ tools according to embodiments of the invention.
Figure 13:
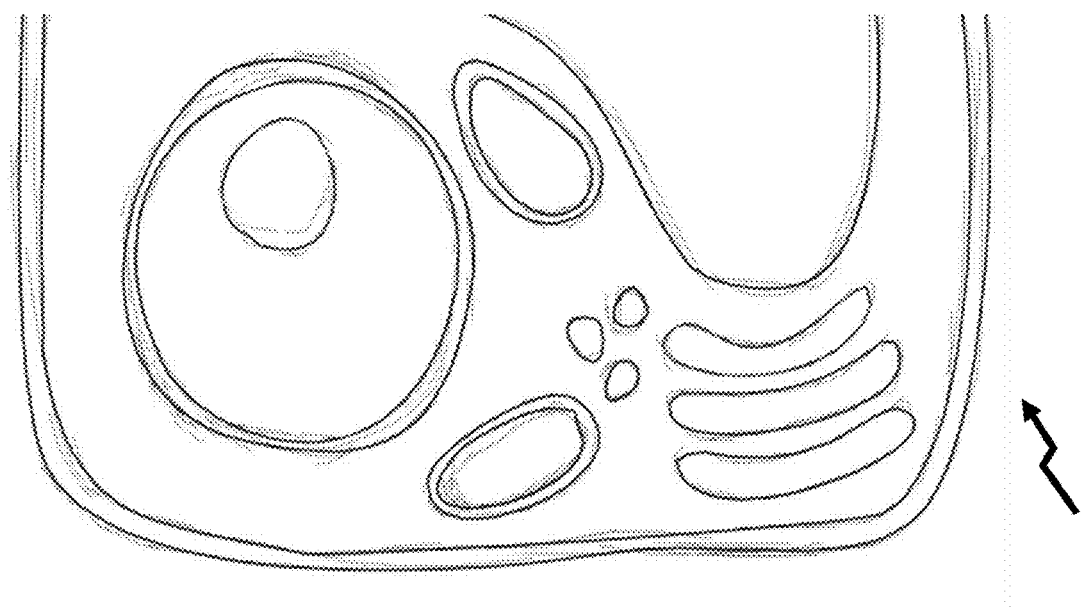

Now referring to FIG. 13 there are depicted a concept sketch 1300 and an artwork 1350, created by Andrew Stacey, as generated within a GSS-GEAP with enabled LiveSketch™ tools according to embodiments of the invention. Accordingly, embodiments of the invention can provide designers, etc. with a sketching/drafting tool in a similar manner to their traditional pen and paper wherein they can subsequently edit and modify the sketch to refine, add, delete, modify etc. or proceed to generate a final graphics image. As the resulting LiveSketch™.

It would be evident to one of skill in the art that the embodiments of the invention described and depicted in respect of FIGS. 3 to 13 may be implemented within a GSS-GEAP such as a desktop software application, within a web-based software application, within a software application upon a FED, PED, wearable device, or alternatively it may be a plug-in, add-on, extension sold individually or separately for such an application.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
acquiring data points relating to a plurality of discrete user generated strokes made with a mark making tool within a computer based graphics software application in execution upon a microprocessor based computer;
converting the plurality of discrete user generated strokes to a plurality of vector poly-curve lines by:
comparing original un-approximated pairs of polylines presenting pairs of discrete user generated strokes of the plurality of discrete user generated strokes to each other to generate a set of properties of a plurality of sets of properties for that compared original un-approximated pair of polylines;
feeding the plurality of sets of properties into a trained feed-forward neural network to determine a plurality of groupings; and
applying a curve fitting routine to each grouping of the plurality of groupings to generate a vector poly-curve line of the plurality of vector poly-curve lines; and
processing the plurality of groupings from the trained feed-forward neural network with a process comprising:
applying a graph theory technique to derive weighted connections between each pair of points;
algorithmically dynamically tuning parameters to tailor for known drawing types and scenarios;
utilizing a minimum spanning tree variant to infer the overall intent of each grouping of the plurality of groupings; and
determining trunk branches within the minimum spanning tree and pruning away smaller branches in at least one stage of a plurality of stages.

2. The method according to claim 1, wherein
acquiring the data points relating to the plurality of discrete user generated strokes comprises:
a) establishing a timer having a defined time duration;
b) starting the timer;
c) acquiring the data points relating to the plurality of discrete user generated strokes within the duration of the time;
d) analyzing multi-dimensional properties of the acquired data points to infer an overall intent;
e) converting the plurality of discrete user generated strokes established within the duration of the timer to a vector poly-curve line of the one or more vector poly-curve lines in dependence upon at least the inferred overall intent;
f) resetting the timer; and
g) repeating steps (b) to (e) in an iterative process to generate additional poly-curve lines; and
the inferred overall intent is established in dependence upon a control setting of the graphics software application.

3. The method according to claim 1, wherein
acquiring the data points relating to the plurality of discrete user generated strokes comprises:
a) establishing a timer having a defined time duration;
b) starting the timer;
c) acquiring the data points relating to the plurality of discrete user generated strokes within the duration of the time;
d) analyzing multi-dimensional properties of the acquired data points to infer an overall intent;
e) converting the plurality of discrete user generated strokes established within the duration of the timer to a vector poly-curve line of the one or more vector poly-curve lines in dependence upon at least the inferred overall intent;
f) resetting the timer; and
g) repeating steps (b) to (e) in an iterative process to generate additional poly-curve lines; and the inferred overall intent is established in dependence upon user learnt behaviour established by the graphics software application.

4. The method according to claim 1, wherein acquiring the data points relating to the plurality of discrete user generated strokes comprises:
a) establishing a timer having a defined time duration;
b) starting the timer;
c) acquiring the data points relating to the plurality of discrete user generated strokes within the duration of the time;
d) analyzing multi-dimensional properties of the acquired data points to infer an overall intent;
e) converting the plurality of discrete user generated strokes established within the duration of the timer to a vector poly-curve line of the one or more vector poly-curve lines in dependence upon at least the inferred overall intent;
f) resetting the timer; and
g) repeating steps (b) to (e) in an iterative process to generate additional poly-curve lines; and the inferred overall intent is established in dependence upon a series of loops within a defined footprint laterally represent a user preference for drawing a single stroke.

5. The method according to claim 1, wherein acquiring the data points relating to the plurality of discrete user generated strokes comprises:
a) establishing a timer having a defined time duration;
b) starting the timer;
c) acquiring the data points relating to the plurality of discrete user generated strokes within the duration of the time;
d) analyzing multi-dimensional properties of the acquired data points to infer an overall intent;
e) converting the plurality of discrete user generated strokes established within the duration of the timer to a vector poly-curve line of the one or more vector poly-curve lines in dependence upon at least the inferred overall intent;
f) resetting the timer; and
g) repeating steps (b) to (e) in an iterative process to generate additional poly-curve lines; and the inferred overall intent is established in dependence upon a continuous series of motions in one direction and then reversing to form a loop represents an intended action of the user rather than the user defining multiple strokes.

6. The method according to claim 1, wherein the computer based graphics software application provides a user of the computer based graphics software application with an option to handle or ignore complex strokes with an arbitrary number of loops when converting the plurality of discrete user generated strokes to a plurality of vector poly-curve lines.

7. The method according to claim 1, wherein the computer based graphics software application dynamically tunes control parameters for converting the plurality of discrete user generated strokes to a plurality of vector poly-curve lines in dependence upon a drawing type established by a user of the computer based graphics software application.

8. The method according to claim 1, further comprising smoothing the final result in dependence upon a polynomial form of a vector poly-curve line of the one or more vector poly-curve lines.

9. The method according to claim 1, further comprising applying aggressive smoothing in areas where multiple strokes join.

10. The method according to claim 1, further comprising algorithmically dynamically tuning parameters of the conversion of plurality of discrete user generated strokes to the plurality of vector poly-curve lines in dependence upon a known drawing type associated with a canvas within the computer based graphics software application to which the mark making tool is applied.

11. The method according to claim 1, further comprising heuristically connecting relevant points based on time, spatial, and relational proximity to establish each original un-approximated pair of polylines.

12. A method comprising:
acquiring data points relating to a plurality of discrete user generated strokes made with a mark making tool within a computer based graphics software application in execution upon a microprocessor based computer; and
converting the plurality of discrete user generated strokes to a plurality of vector poly-curve lines; wherein
converting the plurality of discrete user generated strokes to a plurality of vector poly-curve lines comprises:
a) establishing a timer having a defined time duration;
b) starting the timer;
c) acquiring a subset of the plurality of discrete user generated strokes established within the duration of the timer;
d) processing the subset of the plurality of discrete user generated strokes acquired within the duration of the timer to create a subset of the plurality of vector poly-curve lines;
e) resetting the timer; and
f) repeating steps (b) to (e) in an iterative process to generate other subsets of the plurality of vector poly-curve lines; and
step (d) comprises:
comparing original un-approximated pairs of polylines presenting pairs of discrete user generated strokes with the subset of the plurality of discrete user generated strokes to each other to generate a set of properties of a plurality of sets of properties for that compared original un-approximated pair of polylines;
feeding the plurality of sets of properties into a trained feed-forward neural network to determine a plurality of groupings; and
applying a curve fitting routine to each grouping of the plurality of groupings to generate a vector poly-curve line of the subset of the plurality of vector poly-curve lines.

13. The method according to claim 12, wherein the acquired subset of the plurality of discrete user generated strokes established within the duration of the timer are those remaining at the expiration of the timer such that a user can delete one or more discrete user generated strokes during the duration of the timer.

14. The method according to claim 12, wherein the acquired subset of the plurality of discrete user generated strokes established within the duration of the timer are those at the expiration of the timer such that a user can modify one or more discrete user generated strokes of the plurality of discrete user generated strokes generated during the duration of the timer.

15. The method according to claim 12, further comprising providing a user of the computer based graphics software application with an option within a graphical user interface to reset the timer prior to its expiration; wherein
the user is able to at least one of adjust one or more discrete user generated strokes of the subset of the plurality of discrete user generated strokes generated prior to the resetting of the timer and delete one or more other discrete user generated strokes generated prior to the resetting of the timer.

16. A method comprising:
acquiring data points relating to a plurality of discrete user generated strokes made with a mark making tool within a computer based graphics software application in execution upon a microprocessor based computer; and
converting the plurality of discrete user generated strokes to a plurality of vector poly-curve lines by:
comparing original un-approximated pairs of polylines presenting pairs of discrete user generated strokes of the plurality of discrete user generated strokes to each other to generate a set of properties of a plurality of sets of properties for that compared original un-approximated pair of polylines;
feeding the plurality of sets of properties into a trained feed-forward neural network to determine a plurality of groupings; and
applying a curve fitting routine to each grouping of the plurality of groupings to generate a vector poly-curve line of the plurality of vector poly-curve lines; wherein
the trained feed-forward neural network was trained with a process comprising:
receiving from a user a sketch comprising a plurality of other discrete user generated strokes;
rendering within a graphical user interface the plurality of other discrete user generated strokes and highlighting pairs of other discrete user generated strokes of the plurality of other discrete user generated strokes;
receiving from a user for each highlighted pair of other discrete user generated strokes of the plurality of other discrete user generated strokes an indication of whether the highlighted pair of other discrete user generated strokes of the plurality of other discrete user generated strokes are in a group or not; and
training the feed-forward neural network with the plurality of other discrete user generated strokes and the indications from the user with respect to the pairs of other discrete user generated strokes of the plurality of other discrete user generated strokes.

\* \* \* \* \*